United States Patent [19]
Luxon

[11] Patent Number: 4,808,481
[45] Date of Patent: Feb. 28, 1989

[54] INJECTION MOLDING GRANULES COMPRISING COPPER COATED FIBERS

[75] Inventor: Bruce A. Luxon, Stamford, Conn.

[73] Assignee: American Cyanamid Company, Stamford, Conn.

[21] Appl. No.: 925,848

[22] Filed: Oct. 31, 1986

[51] Int. Cl.[4] ........................ B32B 9/00; B32B 15/00; D04H 1/58

[52] U.S. Cl. .................................... 428/407; 428/367; 428/372; 428/389; 428/378; 428/392; 428/395; 428/408; 523/205; 524/494; 524/495; 524/496; 525/186

[58] Field of Search ............... 428/288, 367, 372, 375, 428/392, 395, 379, 389, 378, 407, 408; 524/494, 495, 496; 525/186; 427/385.5; 523/200, 201, 202, 206, 222, 205, 209

[56] References Cited

U.S. PATENT DOCUMENTS

| | | | |
|---|---|---|---|
| 3,249,411 | 5/1966 | McWilliams et al. | 428/392 X |
| 3,495,940 | 2/1970 | Stuetz | 23/209.3 |
| 3,550,247 | 12/1970 | Evans et al. | 29/419 |
| 3,709,773 | 1/1973 | Hall | 428/375 |
| 3,948,673 | 4/1976 | Chase et al. | 428/378 X |
| 4,037,011 | 7/1977 | Hattori et al. | 428/392 X |
| 4,169,186 | 9/1979 | Tazaki et al. | 428/407 |
| 4,169,911 | 10/1979 | Yoshida et al. | 428/389 X |
| 4,312,917 | 1/1982 | Hawley | 428/379 X |
| 4,340,440 | 7/1982 | Chute | 427/385.5 |
| 4,481,249 | 11/1984 | Ebneth et al. | 428/389 X |
| 4,532,187 | 7/1985 | Hoenig et al. | 525/186 X |
| 4,547,530 | 10/1985 | McCreedy et al. | 525/186 |
| 4,664,971 | 5/1987 | Soens | 428/288 |

FOREIGN PATENT DOCUMENTS

| | | |
|---|---|---|
| 57-57851 | 12/1982 | Japan . |
| 59-53640 | 12/1984 | Japan . |
| 60-17095 | 1/1985 | Japan . |
| 489585 | 10/1975 | U.S.S.R. . |

OTHER PUBLICATIONS

B. W. Howlett et al., (*Proceedings of the International Conference Organized by the Plastics Institute,* Unwin Bros., Ltd., Surrey, Feb. 1971, pp. 99-106.

M. Sakai et al., *Japan Institute of Metals Journal,* 43 181-189, 1979.

N. C. W. Judd (*Composites,* Dec. 1970, p. 345).

V. N. Sakovich et al., (*Fiz. Khim. Obrab. Mater.,* 1975 (2) 112-115 (1975).

B. C. Pai et al., (*Journal of Materials Science, Letters,* 15 1860-1863, (1980).

Kuzmin et al., *Fiz. Khim, Obrab, Mater.,* 1975(5) 101-106.

*Primary Examiner*—Lorraine T. Kendell
*Attorney, Agent, or Firm*—Michael J. Kelly; Steven H. Flynn

[57] ABSTRACT

Elongated injection molding granules comprising fibers, which have a core and at least one relatively thick, uniform and firmly adherent, electrically conductive layer comprising on said core bonded with a thermally stable thermoplastic adhesive.

20 Claims, 18 Drawing Sheets

INJECTION MOLDING GRANULES COMPRISING COPPER COATED FIBERS

CROSS-REFERENCE TO RELATED APPLICATIONS

This application is related to the following commonly assigned concurrently filed patent applications:

| Serial No. | Applicant | Title |
|---|---|---|
| 06/925,851 | Franklyn Arthur Ballentine | Copper Coated Fibers |
| 06/925,842 | Donna Anne Hutto<br>Ward Charles Stevens<br>Franklyn Arthur Ballentine<br>Charles Kaufmann | Process for the Production of Copper Coated Fibers |
| 06/925,841 | Ward Charles Stevens<br>Donna Anne Hutto | Composites Comprising Copper Coated Fibers |

FIELD OF THE INVENTION

This invention relates to a tow or bundle of copper coated fibers, to a method for producing such tows, and to composites produced from such fiber tows. The coated fibers of this invention may be used in a number of ways. Tows or fibers can be chopped and used as a radar obscuration chaff for example. Tows can also be incorporated into composites with various matrices. Composites using copper coated fibers can have the advantages of copper, such as high electrical and thermal conductivity, and can overcome some of the deficient properties of copper such as its high density and high coefficient of thermal expansion.

BACKGROUND OF THE INVENTION

The prior art describes fibers coated with metal and composites produced therefrom. For example, in commonly assigned, U.S. application of Morin, Ser. No. 650,583, filed Sept. 12, 1984, and now U.S. Pat. No. 4,661,403, graphite and other semimetallic fibers coated with thin, uniform and firmly adherent electrically conductive layers of metals, including nickel and copper are described. In Morin, Ser. No. 507,603, filed June 24, 1986, now U.S. Pat. No. 4,680,093, their use in metal composites is described. In Iwaskow and Crum, Ser. No. 358,549, filed Mar. 16, 1982, now U.S. Pat. No. 4,752,415, their use in polymeric composites is described. In Morin, Ser. No. 630,709, filed July 13, 1984, now allowed, their use in radar reflecting chaff is described. In Luxon, Ser. No. 869,518, filed June 2, 1986, their use in elongated injection molding granules is described. However, such coatings, while uniform and firmly adherent and electrically conductive, are relatively thin being of the order of 0.25 to 1.0 microns, more normally 0.5 microns in thickness. As such, they do not render themselves useful in certain applications, particularly as starting materials for direct consolidation into composites. It would be desirable to produce such fibers being uniformly and somewhat more relatively thick.

Other prior art, however, which describes thicker coatings, do not have good uniformity of coating thickness either around the fiber circumference, from fiber to fiber throughout the tow, or along the length of the tow. Some prior art materials have heavily coated fibers on the outside of the tow while inner fibers remain uncoated. Other prior art materials contain fibers which are plated together in groups leaving a deficiency of copper in the inside of each agglomerate.

Generally, such features are disadvantageous because they give uneven or irregular properties to any material made from them. In particular, if copper coated fibers are formed into copper matrix composites by consolidating under heat and pressure, a lack of uniformity of the coating thickness will result in an irregular distribution of the base fiber throughout the resulting copper matrix. The presence of uncoated fibers and agglomerates of fibers leads to voids in the matrix in such a composite. Such an uneven distribution of fibers and voids cause poor mechanical properties as well as uneven thermal or electrical conductivity. Agglomerations of fibers can also cause the tow of fibers to be difficult to spread and can thereby make difficult the production of thin composites. In addition, the presence of agglomerations can make the tow of fibers less flexible and so make production of filament wound or woven materials difficult.

Among the prior art proposals to produce copper coated fibers, in particular copper coated carbon fibers, electrolytic plating, electroless plating, a combination of electroless followed by electrolytic plating, cementation, and ion plating have all been tried.

As to electrolytic deposition, B. W. Howlett et al. (*Proceedings of the International Conference organized by The Plastics Institute,* Unwin Bros., Ltd., Surrey, February 1971, pp. 99–106) states that "a very satisfactory method has been developed for the continuous electrodeposition . . . of copper . . . onto tows containing 1000 fibers". The method is only described as electrolytic deposition via an "experimentally formulated cyanate solution". However, their photographs of the fibers show very uneven thicknesses of coating from fiber to fiber, as well as around the circumference of the fibers. Generally, the literature teaches that direct electrolytic deposition of copper gives rough, uneven coatings. For example, M. Sakai et al., *Japan Institute of Metals Journal,* 43 181–189, 1979 found "extremely severe hills and valleys in the surface of the electrocrystallized copper" when a copper sulfate (200 g/l), sulfuric acid (60 g/l) plating solution was used. An accompanying photograph shows that the coating thickness varies from fiber to fiber as well. Japanese Patent Disclosure No. 1985-SHOWA 60-17,095 found that in carbon fiber tows plated from a copper sulfate plating bath, that "knitting is difficult because of poor slidability due to the roughness of the copper-plating layer". The patent reports an improvement in slidability when a commercially prepared brightner, UBAC-1, and chloride ions were added to the plating solution. However, no documentation of the coating structure is provided, and when repeated herein, unsuitable coatings were obtained as shown in the comparative examples to follow.

As to electroless deposition, attempts to coat carbon fibers with copper using an electroless copper plating process is reported by several workers. Some reports are vague and insufficiently detailed, for example U.S. Pat. No. 3,550,247 states that "a large bundle of fibers may be coated with metal substantially uniformly", but does not give a specific procedure for plating copper. A report by N. C. W. Judd (*Composites,* Dec. 1970, p.345) used a proprietary electroless solution to deposit copper onto carbon fibers, but poor coating was obtained. It was stated that "coverage of the fibers at the center of the tow was not achieved." Other reports have used electroless plating to coat carbon fibers with copper. V. N. Sakovich et al. (*Fiz. Khim. Obrab. Mater.* 1975(2) 112–115 (1975)) precipitated copper by treating the fiber surfaces with boiling water, stannous chloride solution, and palladous chloride solution. Then "a number of electrolytes in which formaldehyde solution was used as a reducing agent were tested". They report that "a bright coating, uniform in thickness on all fibers of the tow, was obtained from the following electrolyte: A:170 g/l Seignette salt (potassium sodium tartrate), 50 g/l sodium hydroxide, 30 g/l sodium carbonate; B: 40 percent formaldehyde solution; A:B=5:1 (ph 12.3, temperature 20C)". It was reported that "the average precipitation rate of the coating was 0.03 micron/minute for a charge density of the electrolyte of 0.6 $dm^2/l$. When repeated herein, the coating produced was poor as will be shown. German (Federal Republic of Germany) Pat. No. 2,658,234 describes a process "for coating individual fibers of a bundle, in which the fiber bundle is exposed to a reaction solution from which, by a currentless chemical means, a substance is deposited onto the fiber." In order to assure individualization of the fibers of the tow, "a portion of the fiber bundle is loosely suspended, and . . . the reaction solution is fed along the fibers of this portion". It is stated that "Because of the spreading of the fibers, the reaction solution can reach the surfaces of all the fibers. The fibers can thus be uniformly coated over both their length and their cross section". In one sample embodiment, it is reported that "it is possible . . . to uniformly deposit a 1 micron copper layer on the individual fibers of the bundle". However, when repeated herein, unsuitable coatings were produced as will be shown in the comparative examples.

As to a cementation process, B. C. Pai et al. (*Journal of Materials Science, Letters,* 15 1860–1863 (1980)) reported on the use of a cementation process to deposit copper and other metals on carbon fibers. It was disclosed that whereas nickel and cobalt coat the fibers uniformly, "copper coating takes place by bridging . . . isolated precipitates". FIGS. 3 through 7 in this reference show irregular thickness copper coatings As to ion plating or vacuum deposition, the prior art discloses the use of ion plating or vacuum deposition to form "an assembly . . . of a plurality of carbon fibers each coated with a matrix metal layer, the fibers having bonded points at the metal layers". This process does not form individualized fibers. Japanese patent disclosure No. 1982-SHOWA 57-57,851 discloses use of ion plating to coat fabrics of carbon fibers. However, the goal of this process is not to form individualized fibers as the present invention requires and forms.

As to electroless followed by electrolytic deposition, A. M. Kuz'min et al. (USSR Pat. No. 489,585, and *Fiz. Khim. Obrab. Mater.,* 1975(5) 101–106) reported carbon fiber tows coated with copper prepared by depositing a layer of copper using an electroless process and subsequently depositing further copper electrolytically. It was stated that the process gives a material in which "all elementary fibers are covered with a uniform layer of metal in the process of chemical precipitation . . . the filling with metal during the electrolytic build-up of the layer also proceeds uniformly". When repeated herein, however, uniform layers were not obtained. U.S. Pat. No. 3,495,940 discloses a process "comprising the steps of (1) forming thin films of sensitizing and activating metals on the surface of an organic fiber, (2) electrolessly plating, a thin layer of copper on the activated surface, (3) electrodepositing additional copper on top of said copper layer". The process was used to form copper coatings comprising 10 to 50% by weight of said organic fiber. This is a coating thickness of only 0.048 to 0.24 microns for an organic fiber having a density of 1.25 $g/cm^3$, too thin to provide the advantages of the relatively thick copper coatings required herein. The patentee, moreover, used this fiber to electrically heat the organic fiber to the point that the fiber carbonizes and graphitizes to a carbon fiber. Since such processes reduce the volume of the basic fiber, the carbon fiber is not attached to the metal coating. No discussion was included concerning the way in which the fiber tow was handled. Japanese Patent Publication No. 1984-59 SHOWA-53640 discloses "compound plating, which is a combination of electroless plating and electroplating". In this method, the carbon fibers are held under tension on a frame and then coated. The object of the process was to produce a "prepreg" of copper and carbon fibers and not to produce individualized coated fibers. Composites produced by hot pressing the prepregs were unsuitable because they had non-uniform distributions of fibers as evidenced by photographs of cross sections presented therein. Kuz'min, cited above, used a process of air oxidation or nitric acid etching, followed by electroless plating, and then electrolytic plating. While the bath components are given, no specific bath formulation is given. In addition, no fiber handling techniques are noted. EPO No. 0-156-432 discloses the coating of single optical fibers with a combination of electroless followed by electrolytic plating. "In a favorable embodiment . . . the fiber . . . is electroless plated continuously in a first step and is electroplated continuously with a metal layer in a second step . . . . the fiber is passed successively through a number of deposition baths alternated by rinsing baths . . . . In a particularly advantageous embodiment . . . a layer of metal is provided continuously by electrodeposition on the electrically conductive layer in at least two successive steps, in which between the successive steps the current density is increased and the metal-coated fiber is electrically contacted". No plating of copper is actually exemplified.

Also disclosed in the prior art, are composites that have a copper matrix reinforced with fibers, these having been formed by a number of techniques. For example, tows of reinforcing fibers can be impregnated with a slurry of copper powder and then consolidated under heat and pressure. Sometimes this process may involve sandwiching the fibers between copper foils. Such methods, however, have several disadvantages. Since copper does not spontaneously wet some fibers, especially carbon fibers, additives, for example, titanium, must be provided in the copper to permit wetting. However, such additives reduce the thermal and electrical conductivity of pure copper. Such composites also have unevenly distributed reinforcing fibers.

To avoid having to wet the carbon fiber with liquid copper it is advantageous to coat the fibers with copper individually and consolidate the coated fibers under heat and pressure. This general procedure has been used by a number of workers. However, since the ability to coat all the fibers of a tow uniformly has been limited, it has not been possible until the present invention to create uniform distribution of reinforcing fibers in a copper matrix composite. In addtion, it is not uncommon for hot pressing to be done at very high temperatures (around 900° C.) which can cause dewetting of a copper coating from a carbon fiber and lead to defects at the copper/carbon interface. The present invention avoids this drawback, too.

SUMMARY OF THE INVENTION

An object of this invention is provide tows of fibers that are uniformly coated with copper which are useful as reinforcing fibers or as fillers in composites that require high thermal or electrical conductivity. Such tows of fibers can be used as "free" fibers (as compared to fibers embedded in a matrix). For example, the fiber can be chopped and used as chaff, or it can be used as conductive brushes.

Another object of this invention is to provide a process by which fibers may be coated uniformly with copper.

A further object of this invention is provide copper matrix composite materials that are useful as materials for low density radiators, low thermal expansion electrical conductors, and other applications.

According to one aspect of this invention, there are provided yarns and tows comprising composite fibers, which have a core and at least one relatively thick, uniform and firmly adherent, electrically conductive layer comprising copper on said core.

According to another aspect of the invention, such tows of composite fibers are produced by a process comprising (1) immersing at least a portion of the length of the fiber in a bath of an aqueous solution of a wetting agent, (2) sensitizing the fiber surface to the electroless deposition of a metal comprising copper by immersion in a bath of a colloidal suspension of palladium and tin chloride, (3) immersion in a bath capable of electrolessly plating the fibers with a metal comprising copper and depositing an electrical conductive layer of metal on said fibers, (4) immersion in a bath capable of electrolytically plating with a metal comprising copper, and (5) applying an external voltage between the fibers and the bath sufficient to deposit a metal comprising copper on the fibers, the voltage and resulting current to be applied for a time sufficient to produce a relatively thick, uniform and firmly adherent coating comprising copper on said core. These steps must be carried out under low tension and with spreading of the tow.

Such fiber can be used as "free" fiber or, according to still another aspect of the invention, it can be formed into composites comprising a continuous yarn or tow of composite fibers, the majority of which have a core and at least one relatively thick, uniform and firmly adherent electrically conductive layer comprising copper on said core, disposed in a matrix comprising a metal or an organic polymer. These matrices can be formed by incorporation, by direct consolidation by hot pressing or other methods. In the latter case, the composites obtained have a uniform distribution of fibers throughout.

According to yet another aspect of the invention, an injection molding compound comprising elongated granules containing a bundle of elongated composite fibers can be produced. Said fibers have a core and at least one relatively thick, uniform and firmly adherent, electrically conductive layer comprising copper on said core, such fibers extending generally parallel to each other, lengthwise in the granule and uniformly dispersed throughout the granule in a thermally stable, film forming thermoplastic adhesive.

DESCRIPTION OF THE DRAWINGS

FIG. 3b is a side elevational view of the beater bar arrangement of FIG. 3a.

DETAILED DESCRIPTION OF THE INVENTION

Figure 1:
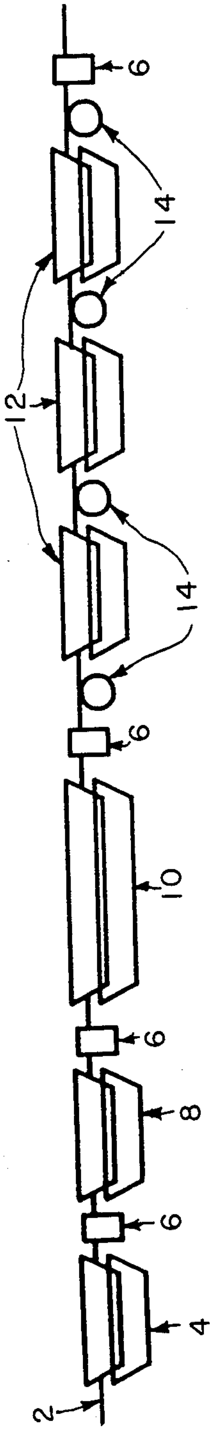
FIG. 1 is a schematic view of the plating process in the present invention.

With respect to the first two aspects of the invention, the fibers and processes for their preparation, the fundamental improvement of the present invention over the prior art is to provide tows of fibers 2 containing as many as 12,000 (12K) fibers that are coated with copper. The present invention provides tows 2 in which the copper coating is distributed very uniformly over the fibers of the tow 2. The fibers of this invention may have a coating thickness of between about 0.5 microns and about 3.0 microns of copper, preferably from about 0.6 microns to about 3.0 microns, especially preferably, greater than at least about 0.8 microns, and most preferably, greater than at least about 1.2 microns. The coating thickness is uniform around the circumference of the fiber, having a standard deviation in thickness that is no more than 30% of the average thickness. It is also uniform from fiber to fiber, having a standard deviation in thicknesses that is less than 30% of the average thickness. In addition, the fibers have a low degree of agglomeration. In the present invention, typically 80% of the fibers of the tow 2 are present as individually coated fibers. As a result of the low agglomeration in the fiber tows 2 of this invention, the tows 2 are flexible and slidable. Furthermore, the copper coating of this invention can be very pure. This means that the highest thermal and electrical conductivities can be obtained.

The base fibers of this invention include carbon, graphite, polymeric, glass or ceramic fibers. The choice of base fiber will depend on the nature of the application envisioned for the coated fiber 30. Structural carbon fibers, such as those produced from polyacrylonitrile (PAN), having moduli in the range of 30 to $50\times10^6$ pounds per square inch (psi), would be selected for applications where moderate strain to failure in the composite were needed. Graphite fibers such as those produced from pitch that have moduli from 55 to $140\times10^6$ psi might be used where very high thermal or electrical conductivity or very low thermal expansion were required. Ceramic fibers having a high diameter might be used in applications where compression strength were needed. Other criteria will be evident to those familiar with the design of composite materials.

The process of this invention, as diagrammed in FIG. 1, has several novel and useful characteristics. The process of this invention employs a conventional composition for the electroless bath, but includes preferred features to provide stability, speed of plating and uniformity of coating on the individual fibers throughout the tow 2. The coating process provides a uniform product in either a batch or continuous process, with good rates of production and good stability of the component solutions.

The continuous version of the process uses features designed to give very little tension to the fiber tow 2 and spread the tow 2. Damage to the fiber is reduced preferably by using a "straight through" design in which the fiber travels an essentially straight path through the plating line. This enables very low strain-to-failure fibers such as pitch based carbon fiber (e.g., Amoco Inc.'s P100 and P120 fibers) to survive the rigors of a continuous plating process.

Preferably, and with reference to FIG. 1, the copper coating process of the invention comprises the following steps taken in order:

(i) Wet with an aqueous surfactant solution
(ii) Rinse
(iii) Sensitize in a colloidal suspension of tin and palladous chloride
(iv) Rinse
(v) Coat with a layer of electroless copper
(vi) Rinse
(vii) Coat with a layer or layers of electrolytic copper in baths having varying current densities
(viii) Rinse
(ix) Dry Rinsing steps (ii), (iv), (vi) and (viii) are optional.

As to step (i), the need for an electroless copper solution with high deposition rates requires the use of a formaldehyde reduced bath. Although higher rates were obtained with this bath, the tows 2 had poor through-plating resulting in uncoated inner filaments. To overcome this, a wetting agent suitable for carbon surfaces should be used to allow for better penetration into the tow 2 and adsorption of catalyst Among the suitable agents are Arquad® B-100, a surfactant made by Armak Chemicals (a division of Akzo Chemie America, Chicago, Ill.). It can be used at concentrations of 0.1 to 1.0% in water, although higher and lower concentrations are also possible. When used to wet carbon fiber bundles, uniform electroless plating of every filament in a 12K tow 2 can be obtained. Such fibers are then easily electroplated in an electrolytic plating bath 12 such as an acidic copper plating bath. Such copper coated carbon fibers 30 produced by a batch process are suitable for use to create copper matrix composites as will be exemplified hereinafter. The electroless solution can also contain other additives. For example, 1 ppm of mercaptobenzothiozole (MBT) can be included to provide stability to the bath. In addition, the sensitizer solution (iii) can also be improved in stability by omitting urea which is commonly used. These preferred features result in more stable sensitizing 8 and electroless 10 baths with high deposition rates. Special mention is made of the use of a combination of 2,2'-dipyridyl and mercaptobenzothiazole. This further improves stability of the electroless bath 10 while maintaining a high rate of deposition. Such solutions can be replenished with copper sulfate, formaldehyde and NaOH and used over several days, which is a substantial advantage.

Although conventional acidic copper electroplating solutions deposit copper onto the electroless copper layer in step (vii), the deposits can be dull, or rough or tend to oxidize soon after plating. In a preferred feature of this invention, the acidic copper solution will be replaced with a pyrophosphate copper plating solution, which results in brighter deposits that do not oxidize as rapidly as those from the more conventional acidic solutions. Acidic copper plating solutions also have a drawback in the possible dissolution of the thin electroless copper layer on the fiber by the presence of strong acid in the plating solution. If the fiber is made cathodic before entering the solution, such difficulties are minimized.

In any event, unless careful attention is paid to tow tension, plating can be very poor, especially on the central filaments of the fiber tow 2 when high tension is placed on the fiber. This is avoided if the fiber has little or no tension. In preferred embodiments of a continuous coating process, all tension will be removed. This results in all fibers being well plated. Further details of the preferred processes, both batch and continuous, will be given in the Examples.

With respect to the solutions used, a preferred wetting agent bath 4 (Bath 1) is preferably 1 ml. of Arquad® B-100 surfactant per liter of deionized water. Arquad® B-100 is a cationic, surface active, water soluble benzylalkylammonium chloride. It is a 49% solution of alkyl dimethyl ammonium chloride with alkyl groups derived from fatty acids, with a typical molecular surfactant not only modifies the surface energy of the fiber so that it is easily wet by aqueous solutions, but it also enhances the adsorption of the tin and palladium used as sensitizers on the fiber surface.

A preferred sensitizing bath 8 (Bath 2) comprises:

1 g. $PdCl_2$ dissolved in 500 ml. deionized $H_2O$;

300 ml. HCl—35% hydrochloric acid carefully added to palladium chloride solution while stirring;

1.5 g. $SnCl_4$ dissolved in 100 ml. of 35% HCl acid then added to the above solution Heat to 80 deg. C then add 37.5 g. $SnCl_2$ and Deionized water to 1 liter total volume then cool to room temperature and hold for 16 hours.

The catalyst is a mixed system and is similar to available commercial formulations. It is preferred herein, however, not to use sodium chloride in the sensitizing bath 8, although commercial catalysts containing large amounts of sodium chloride can be used. A suitable electroless copper bath 10 (Bath 3) comprises:

19 g. $CuSO_4*5H_2O$ dissolved in 750 ml. deionized $H_2O$ then add while stirring add the following:

31.6 g. EDTA disodium salt, dihydrate (ethylene diamine tetraacetic acid)

2 ml. MBT (mercaptobenzothiozole) solution at 0.5 g of MBT per liter methanol 16 g. NaOH dissolved in 100 ml. of deionized $H_2O$ heat copper solution to 45 deg C and immediately before use add 15 ml. formaldehyde Water to make one liter Another suitable and especially preferred electroless copper bath (Bath 4) comprises:

10 g. $CuSO_4*5H_2O$ dissolved in 750 ml. deionized $H_2O$ then, while stirring, add the following:

30 g. EDTA disodium salt , dihydrate (ethylene diamine tetraacetic acid)

0.5 ml. MBT (mercaptobenzothiozole) solution at 0.5 g of MBT per liter methanol 2 ml. of 2,2′ dipyridyl (DP) solution at 2 g/100 ml methanol 10 g. NaOH dissolved in 100 ml. of deionized $H_2O$ Water to 0.990 liter Heat to 45 deg C and immediately before use add: 10 ml. formaldehyde Final pH should be 11.3

In the above electroless copper plating solutions the copper sulfate is the source of the copper ions, EDTA salts act as a chelating agent, DP and MBT are stabilizers, and sodium hydroxide is used to bring the solution a high pH, e.g., 11.3–12.2, formaldehyde will act as a reducing agent at a good rate.

A suitable electroplating bath 12 (Bath 5) comprises: UNICHROME ® Pyrophosphate Copper Plating Process; Technical Information Sheet No. P-C-10-Xb; and employs the following to make 10 gals. of solution (M&T Chemicals Inc., Rahway, N.J.): To 5 gal. of deionized water, add in order the following while stirring:

0.35 gal. M&T Liquid C-11-Xb;

3.33 gal. M&T Liquid C-10-Xb copper pyrophosphate-containing solution; and 0.05 gal. Ammonium hydroxide, C.P.

Fill to total volume of 10 gal. with deionized water. Bath should be operated at 54.5° C. and a pH of 8.3±0.2. A brightner, M&T Addition Agent PY-61-H (0.9 ml/l) can be added if additional brightness is desired.

Other suitable baths are in the literature (Lowenheim).

If a batch process is to be used, it is convenient to use 40 inch long cut sections of tow 2 and a glass weight placed halfway along the tow 2. The tow 2 is then lowered into suitable vessels, e.g., 1 liter graduate cylinders containing the various baths, to provide that the weight rests on the bottom of the cylinder. In this way the fibers in the tows remain aligned.

Figure 2:
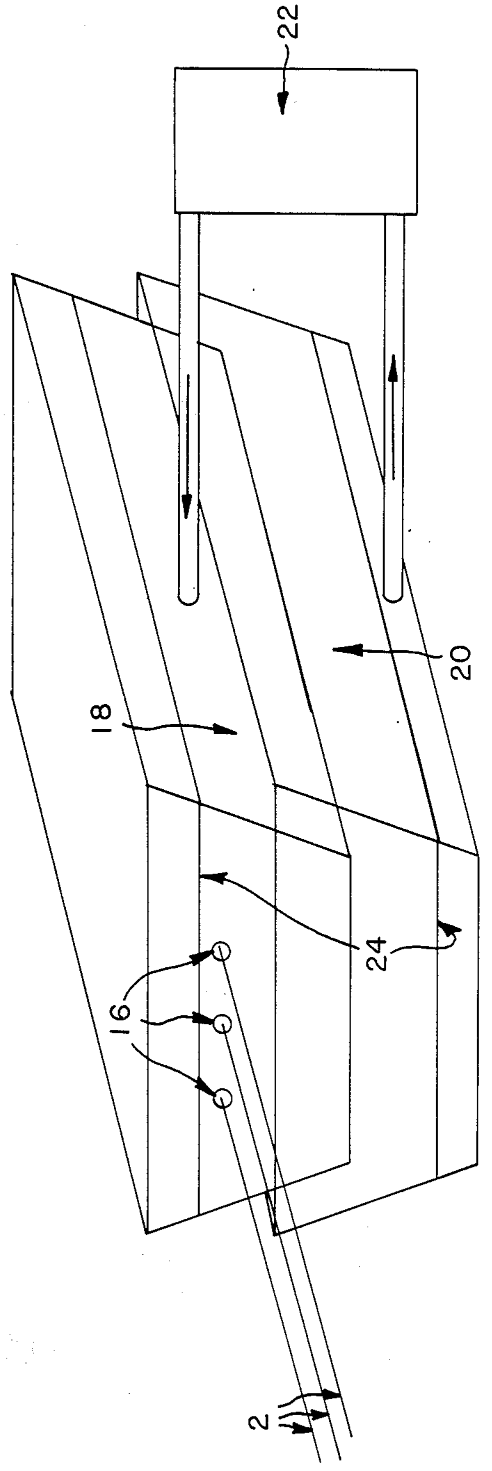
FIG. 2 is a perspective view of the weired plating tank preferred for use in the present invention.

If a continuous process is to be used for the uniform plating of fibers with copper it is convenient to operate as follows:

Referring to FIG. 1, an apparatus for this process can be seen. The tanks of the apparatus, which hold the various solutions, are designed to allow the fiber to be treated with each solution without going over or under rollers which would increase the amount of tension on the fiber. This method of plating is termed line-of-sight plating. FIG. 2 shows such tanks which use a "weired" design, so called because a weir or overflow is created at the exits, or eyelets 16 of the plating tank 18. The overflow from the plating tank 18 is picked up in the reservoir tank 20 and is returned to the plating tank 18 through the use of a pump 22 to maintain a constant solution level 24. Using such tanks, the fiber can be passed through series of baths without having to go around a series of rollers or guides after the initial unspooling. It is possible to run several tows 2 in parallel through the apparatus. For example, eight tows 2 can be plated at a time, or even more.

For feeding, spools of uncoated fiber (not shown) can be supported on bearings which allow the fiber to be unspooled while creating very little tension. The fiber tows 2 are then threaded through eyelets 16 which guide the fiber into the first bath (FIG. 2). As shown in FIG. 1, the first bath contains a wetting agent, e.g., Arquad ® B-100 in a 0.1 vol. % solution in the top tank 18, as shown in FIG. 2. Filtration of the solution, which is performed by in-line filters, is very desirable to keep all solutions free of an accumulation of broken fibers.

Next, the fiber is then passed through an optional rinse station 6, desirably to remove any excess surfactant or "drag-through" which can influence the chemistry of succeeding baths. A suitable rinse station 6 consists of a table over which the fiber runs, and a water spray directed downward onto this table. The force of the water spray and subsequent run-off the edges of the "table" help to spread the fiber.

The second tank in the series contains a catalyst bath 8, such as an emulsion of palladous chloride and stannous chloride in a hydrochloric acid solution (Bath 2). This solution serves to activate the surface of the fiber for the electroless deposition of copper. The bath is circulated with a resevoir tank 20 to maintain the concentration of the components. The fiber is again optionally, but preferably, rinsed after leaving this tank. This rinse is very desirable because drag-out to the following electroless plating tank 10 may severely limit the life and efficiency of the electroless plating solution.

As is shown in FIG. 1, the third bath 10 is in a long tank, to provide a sufficient residence time for for electroless plating. The bath 10 contains an electroless copper plating solution, such as given for Bath 3 or 4, above. The bath 10 temperature is maintained in a resevoir tank 20 from which the solution is pumped, as shown in FIG. 2. The heated solution is then pumped into the inner tank 18 of the weired plating tank arrangement. Preferably, the pH of the solution is maintained at 11.3, ±0.5. In accordance with known techniques, stability of the bath 10 is increased by aerating the bath 10 by rapid pumping, stirring or sparging with a gas dispersion tube. Rapid solution flow also helps in replenishing solution near the fiber in order to increase the depostion rate of the copper. The fiber optionally is again rinsed as before.

Electrolytic plating is performed next in a series of weired tanks all of which are of suitable length, e.g., 20 inches. The plating line may have multiple tanks, e.g., 2, 3, 4, or more, and these many have different current densities. For example, the initial electroplating tank 12_a_ can be run with a current of 8 amperes acrossing the electrodes 14 using 8 tows 2 of 2K fiber. Using a low current in the first tanks 12 permits an initial deposition of an electrolytic layer of copper over the electroless copper. The remaining tanks 12 can be operated at currents of 20 to 30 amperes. This facilitates more rapid plating in any of the remaining tanks 12. As will be described, spreading the tow 2 of fibers apart in each of these tanks is crucial to the even plating of the fiber and avoiding the creation of agglomerates. Solution agitation, such as by pumping from a resevoir, and oscillation resulting from the use a fiber spreading device (as in FIG. 3) permits the current to be increased without evidence of hydrogen evolution, a symptom of overvoltages in the plating operation, demonstrating that such agitation results in more efficient plating.

Spreading of the fiber in the electrolytic tanks 12 in accordance with this invention can be carried out in many ways, for example, by use of ultrasonic vibration, agitation of the solution or by physically spreading the fiber. A preferred method uses physically spreading the fibers. Especially preferred is to use beater bars 26 to spread the fibers. A suitable beater bar arrangement can be seen in FIG. 3. The "L"-shaped bar 26 is located between two stationary bars 28 and is oscillated vertically. This agitates the solution, forces fresh solution into the tow 2 of fibers, and spreads the fibers of the tow 2. The movement of fresh solution into the filaments of the tow 2 increases the deposition rate and ensures uniformity of plating. The stationary bars 28 at either end of the tank help to keep the fiber under solution and also keep the fiber spread out when leaving the plating tank 12. A 12K tow 2 of IM-6 fiber can spread to almost 1 inch wide by the time it reaches the final plating tank 12_c_. This spreading keeps the fibers from plating together at neighboring filaments and increases the rate of plating by increasing the mass transfer of solution into the tow 2.

After the fiber has been plated to a sufficient volume fraction of copper, the fiber optionally but preferably is rinsed at a rinse station 6, as described above, and then dried by means of an air knife, heat gun or rotary drum drier. In this case a heat gun is attached to a heating chamber (not shown). The fiber is then spooled, either onto a spool with other tows 2 or preferably individually onto separate spools by a fiber winder (e.g., graphite fiber winders made by Leesona Corp., S.C.) (not shown).

Chaff according to the present invention is prepared by chopping strands of copper coated composite fibers as described above into lengths designed to effectively reflect impinging radar waves. Preferably, the fibers are cut to a length roughly one-half the wavelength of the radar frequency the chaff is intended to be used against or, where very high radar frequencies are encountered, full wavelengths.

In practice, a radar operator may be monitoring several frequencies, currently in the 2–20 GHz range. In the future, radars may be developed using much higher frequencies. An advantage of the chaff of the present invention is that it can be adapted to the present and contemplated radar frequencies. Therefore, while present strategic chaffs may contain different lengths of filament ranging from several centimeters and shorter (e.g., 0.01–10 cm), corresponding to the half wavelengths (or full wavelengths) over an entire bandwidth, the range that may be achieved with the chaff of this invention is from 100 microns to hundreds of meters, depending on the specific use contemplated. However, if the particular impinging frequency to be defended against is known, the chaff may be "tuned" by increasing the proportion of chaff dipoles reflecting that particular frequency, and many more dipoles per unit volume of chaff may be dispersed.

Chaff prepared in accordance with the present invention is highly efficient in comparison with previously known chaff materials because the coating is continuous and of high purity.

In addition, due to the core material, the chaff fibers are much stiffer than prior materials, which facilitates dispersion. This ensures that the dipole length will remain tuned to the object radar frequency.

The dispersibility of the chaff may be assisted by further treatment of the fibers before chopping into strands to make them mutually repellant, or at least non-adhesive. For example, rinsing the coated fiber with a solution to change the surface qualities of the chaff dipoles is a typical method. In the case of the preferred embodiments of this invention, e.g., copper coated carbon fibers 30, sizing the coated fiber with a solution of oleamide in 1,1,1-trichloroethane (e.g., about 10 g/l) should provide a hydrophobic and slippery surface and greatly aid dispersion of the chaff. After the sizing dries and fuses, the plated, sized tow of fibers is typically pulled through a series of rollers or rods ("breaker bars") to break apart fibers stuck together by the sizing. This also is a means of maintaining collimation of the fibers. Other rinses or sizings, as well as other treatments to aid chaff dispersion, will be readily apparent to persons skilled in the art and are fully contemplated herein.

When broad band reflection is desired a certain amount of contact between individual chaff dipoles may be advantageous. Because contact between two chaff dipoles according to the present invention creates an effective longer dipole, controlled contact provides larger dipoles that respond at different frequencies as the chaff disperses and the individual dipoles separate. This is another method of "tuning" the chaff to the radar, made possible by the present invention. Also, core fibers such as graphite fiber are available in various shapes, e.g., X or Y shapes, permitting multilobal radar reflection. A further advantage of the composite fiber chaff herein is its low bulk density.

The small comparative diameters of fibers contemplated herein permit chopping to very short lengths, e.g., 100 microns, so as to be effective against super high frequency radars. Also, broad band reflection is within the scope of the present invention.

A variety of types of composites of the invention can be produced using the fibers having a copper coating thereon as described above. Methods for incorporating such fibers into polymeric and metallic matrices are contemplated. The methods include directly consolidating the copper coated fiber of this invention so that the coating becomes the matrix. Simpy by hot pressing, for example, between 600° C. and 900° C., most preferably between 725° C. and 750° C., in a reducing atmosphere or a vacuum the fibers of this invention can be consolidated to form substantially void-free, uniform composites.

The fibers of this invention can be fabricated into composites by direct consolidation also by "laying up" the fibers. To do so, the fibers are aligned into single layer tow, which optionally may be held together by a fugitive binder or merely the capillary action of water. These layers are then stacked by either keeping the layers aligned in parallel or by changing the angle between adjacent layers to obtain a "cross-plied" laminate. Since the physical properties of the composite and fiber are anisotropic, a range of properties can be achieved by changing the orientation of the various layers of the composite.

Because the coated fibers of this invention have few agglomerations, it is possible to spread the fiber into very thin plies, as low as 3 mils. Thin plies are an advantage when large area structures are to be built, such as radiator structures. In such an application, the composite should be as thin as possible, yet to obtain sufficient stiffness in all directions, several layers, having several orientations, are required. Therefore, the thinner each ply is, the thinner the final, multi-layered composite can be. By making thinner structures, substantial weight savings can be effected which is crucial in any aerospace or transportation application.

Composites produced by direct consolidation of the fibers of this invention have the advantage that the copper remains in intimate contact with the fibers during hot pressing. This is possible because the carbon fibers are coated with copper by the plating process and are consolidated at relatively low temperatures (e.g, 750° C.). This assures that dewetting does not occur during consolidation of the fibers into the composite. The composites of this invention also have the advantage that they have a very uniform distribution of the base fiber throughout the thickness without undesirable matrix-rich regions. In addition, the void content of the composites is low because of the uniformity of coatings and low agglomeration rate of the starting coated fiber 30. Also, the purity of the copper matrix can be very high. The very low agglomeration of the fibers of this invention makes possible thin copper matrix composites, filament wound composites, braided composites and woven composites. The composites of this invention have good mechanical properties due to their uniformity, and good thermal and electrical properties due to the purity of the copper component of the composite.

As the comparative examples will show, none of the fibers produced in the closest prior art, in spite of their descriptions, will meet the characteristics of the fibers herein or produce composites like those provided herein.

The organic polymeric materials for use as matrices in the composites of the invention are numerous and generally any known polymeric material may find application. By way of illustration, some of the known polymeric materials useful in the invention include: polyesters, polyethers, polycarbonates, epoxies, phenolics, epoxy-novolacs, epoxy-polyurethanes, urea-type. resins, phenol-formaldehyde resins, melamine resins, melamine thiourea resins, urea-aldehyde resins, alkyd resins, polysulfide resins, vinyl organic prepolymers, multifunctional vinyl ethers, cyclic ethers, cyclic esters, polycarbonate-coesters, polycarbonate-co-silicones, polyetheresters, polyimides, bismalemides, polyamides, polyetherimides, polyamideimides, polyetherimides, and polyvinyl chlorides. The polymeric material may be present alone or in combination with copolymers, and compatible polymeric blends may also be used. In short, any conventional polymeric material may be selected and the particular polymer chosen is generally not critical to the invention. The polymeric material should, when combined with the composite fibers, be convertible by heat or light, alone or in combination with catalysts, accelerators, cross-linking agents, etc., to form the components of the invention.

Figure 6:
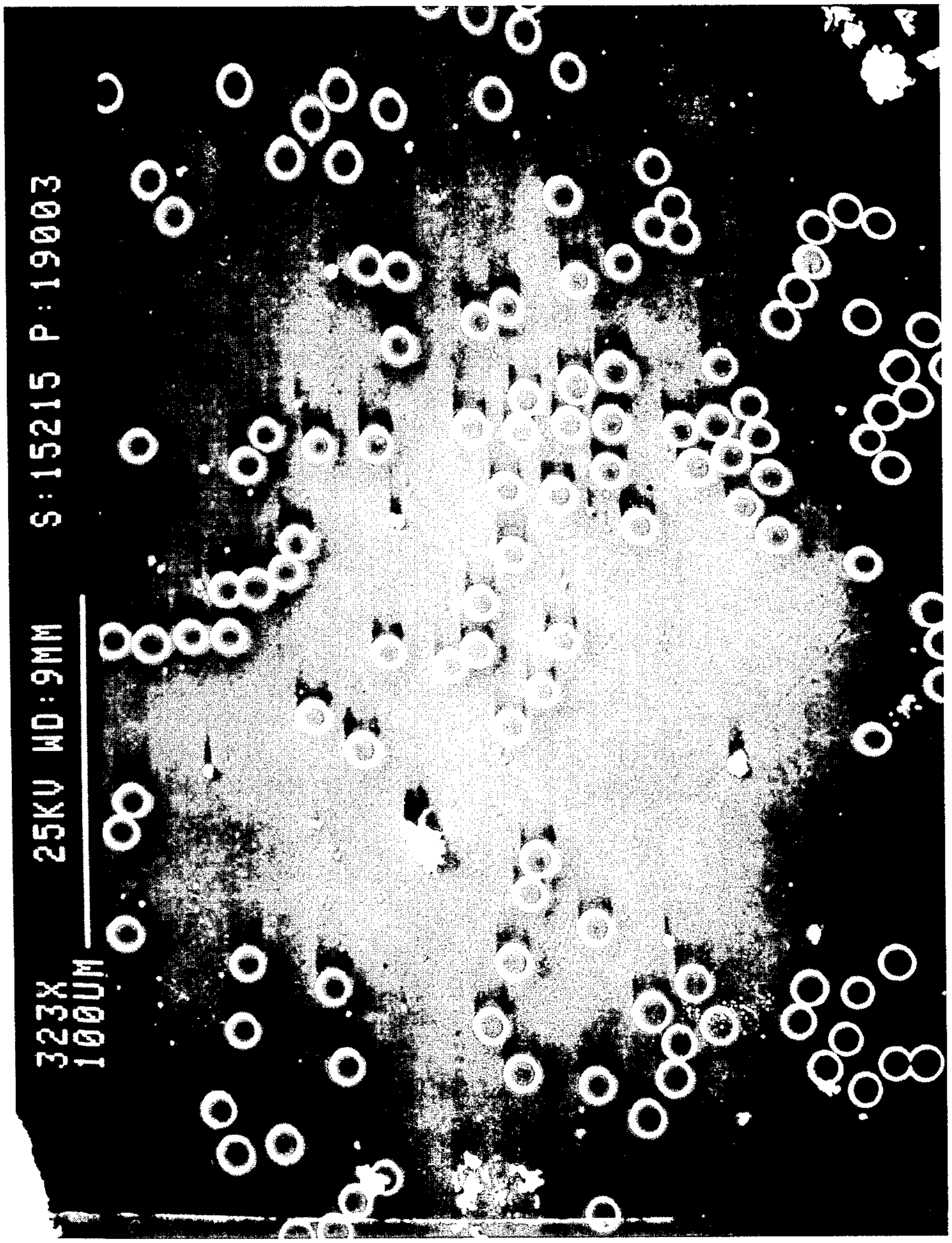
FIG. 6 is a cross-sectioned view of the copper coated fibers of the present invention in a resin matrix, cut perpendicular to the length of the fibers.

The electrically conductive composite fibers 30 used in the invention are shown in FIG. 6 in a cross-section of composite fibers in an epoxy resin matrix. Each composite fiber 30 comprises a core shown in black circles and at least one relatively thick, uniform and firmly adherent, electrically and/or thermally conductive layer of copper, shown in white rings. The core may be made of carbon, graphite, a polymer, glass, a ceramic, or other fibers although carbon and graphite fibrils or filaments are especially preferred. The fibers for use as the core material are commercially available from a number of sources.

Such composite fibers 30 are well-suited for incorporation with polymeric materials to provide electrically conductive components. The composite fibers 30 have a very high aspect ratio, i.e., length to diameter ratio, so that intimate contact between the fibers to provide conductive pathways through the polymer matrix is achieved at relatively low loading levels of fibers, and more particularly at much lower levels than the metal-coated spheres and metal flakes utilized in prior art attempts to provide electrically conductive polymer compositions. This ability to provide electrical, and/or thermal conductivity at low concentrations of fiber, significantly reduces any undesirable degradation or modification of the physical properties of the polymer.

The copper coated fibers 30 may be present in the composites as single strands, or bundles of fibers or yarn. The fibers or bundles may be woven into fabrics or sheets. In addition, the fibers, or bundles may be comminuted and dispersed within the polymeric material, may be made into nonwoven mats and the like, all in accordance with conventional techniques well-known to those skilled in this art.

The composites of the invention are convertible to many components. In one embodiment of the invention, a composite is prepared by immersing and wetting a nonwoven mat of the composite fibers, such as into a polymeric resin solution, such as one formed by dissolving an epoxy resin or a phenolic resin in an alcohol solvent. Other forms such as unidirectional fibers, woven fabrics, braided fabrics and knitted fabrics can be used, too. This composition may then be converted to an electrically conductive component in the form of a resin impregnated prepreg useful for forming electrically conductive laminates. More particularly, the polymer resin solution wetted mat may be heated to drive off the alcohol solvent. When the solvent removal is complete, a component is formed comprising a layer of randomly oriented and over-lapping composite fibers or bundles of fibers having a polymeric resin layer, and in this case epoxy or phenolic resin layer, coating said fibers and filling any voids or interstices within the mat. The resin impregnated prepreg so formed may be cut to standard dimensions, and several of the prepregs may be aligned one on top of the other, to form a conventional lay up. The lay up is then heated under pressure in a conventional laminating machine which causes the polymer resin to flow and then cure, thereby fusing the layers of the lay up together to form a hardened, unified laminate. The impregnating, drying, lay up, and bonding steps for preparing these laminates are conventional and well-known in the art. Further references as to materials, handling and processing may be had from the *Encyclopedia of Polymer Science and Technology,* Volume 8, pages 121-162, Interscience, New York, 1969.

The laminates prepared in accordance with the invention may be cut, molded, or otherwise shaped to form many useful articles. For example, the laminate could be made to form a structural base or housing for an electrical part or device, such as a motor, and because the housing is electrically conductive, effectively ground the device.

In an alternate embodiment, the composition of the invention comprises a thin, normally non-conductive polymer film or sheet and a woven, nonwoven unidirectional sheet, etc., formed of the composite fiber. The polymeric film or sheet may be formed by conventional film forming methods such as by extruding the polymer into the nip formed between the heated rolls of a calender machine, or by dissolving the polymeric material in a suitable solvent, thereafter coating the polymer solution onto a release sheet, such as a release kraft paper with for example a "knife over roll" coater, and heating to remove the solvent. The polymer film or sheet is then heated to between 100° and 200° F. and laminated with the nonwoven mat of composite fibers 30 by passing the two layers between the heated nip of a calender. The resulting component in the form of a fused polymer film supported with a conductive mat is useful, for example as a surface ply for laminates.

Air foil structures made with such laminated composites provide an effective lightning strike dissipation system for aircraft. In the past, if lightning struck aircraft, the non-metallic parts would be subject to significant damage because of their non-conductive nature. With such a laminate forming the outer surface of air foil, should lightning strike the craft, the resulting current will be conducted and dissipated through the conductive fiber mat and conductive base laminate, thereby reducing the risk and occurrence of damage to the airfoil.

Figure 5A:
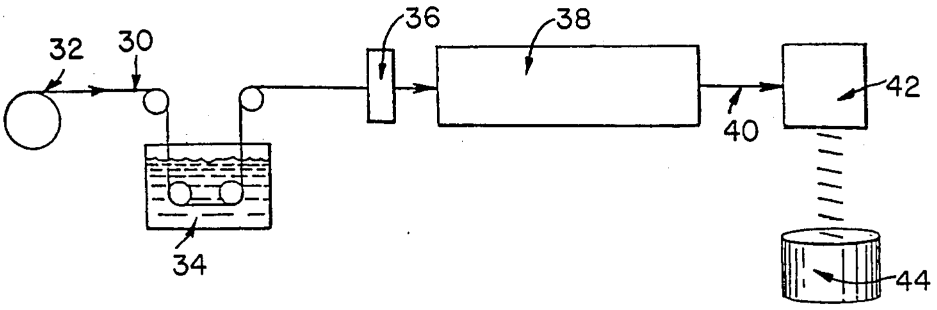
FIG. 5a is a semi-schematic view of a process for making the elongated molding pellets of the present invention.
Figure 5B:
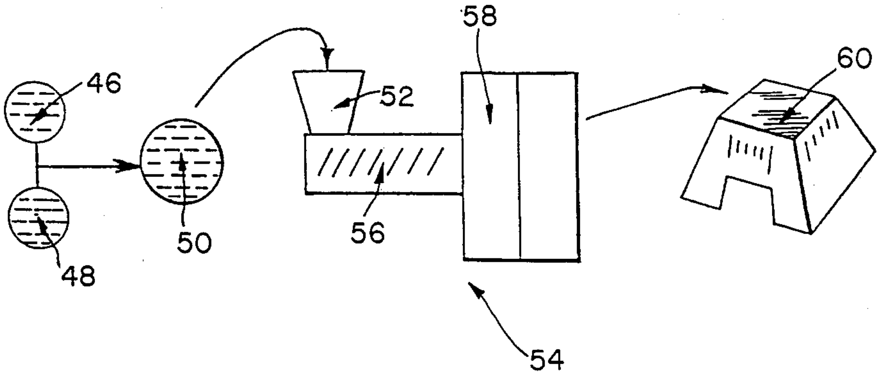
FIG. 5b is a semi-schematic view of a way in which the elongated granules of the present invention are mixed and molded into shaped articles.

In still another embodiment of the invention, shown in FIGS. 5*a* and 5*b*, composites are made from a molding composition 50 wherein the polymeric material is, for example, a polyester, polycarbonate, polystyrene, nylon, etc., resin molding composition having the chopped or comminuted copper coated fiber 30, or woven mats, in contact therewith. The copper coated fibers 30 are dispersed in the resin by conventional means, and the composition is extruded to form pellets 46. The pellets 46 may then be injection molded in accordance with customary procedures to produce shaped electrically conductive molded article 60 (see FIGS. 5*a* and 5*b*). The molded polyester resin articles 60 exhibit good physical properties as well as conductivity.

The elongated granules 46 of this invention each contain a bundle of elongated reinforcing copper coated fibers 30 as defined above extending generally parallel to each other longitudinally of the granule 46 and substantially uniformly dispersed throughout the granule 46 in a thermally stable, film forming thermoplastic adhesive comprising (a) a poly($C_2$–$C_6$ alkyoxazoline) in combination with (b) a poly (vinylpyrrolidone), said adhesive substantially surrounding each filament.

The injection molding compositions 50 comprise:

(i) thermoplastic resin molding granule 48; and (ii) elongated granules 46 comprising 67.5–97.5% by volume of reinforcing copper coated fibers 30 extending generally parallel to each other longitudinally of each of the granule 46 and substantially uniformly dispersed throughout the granule 46 in from 2.5 to 32.5% by volume of a thermally stable, film forming thermoplastic adhesive comprising (a) a poly($C_2$–$C_6$ alkyoxazoline) in combination with (b) a poly (vinylpyrrolidone), the amount of component (ii) in the composition being sufficient to provide 1–60% by weight of the filaments per 100% by weight of (i) plus (ii).

In still another aspect, the present invention contemplates, as an improvement in the process of injection molding, the step of forcing into a mold an injection molding composition 46 comprising a blend of:

(i) thermoplastic molding granules 46; and (ii) an amount effective to provide reinforcement of elongated granules 46 as above defined.

Each filament contained in the injection molding granule 46 is surrounded by and the bundle is impregnated by the thermally stable, film-forming thermoplastic adhesive combination. The pellet 46 itself may be of cylindrical or rectangular or any other cross-sectional configuration, but preferably is cylindrical. The length of the granules 46 can vary, but for most uses, ⅛ inch–¾ inch will be acceptable and ⅛ inch–¼ inch, will be preferred. Unlike the prior art, the pellets 46 of this invention have close-packed filaments and the thermoplastic adhesive jacket is substantially dispersed upon contact with hot molten thermoplastic in the present invention. On the other hand, the prior art pellets will not readily separate into reinforcing filaments because of interference by the relatively thick jacket of thermoplastic resin.

Instead of using a lot of resin to impregnate the fiber bundle and surround it, as is done in the prior art, it is essential to use an adhesive efficient for the purposes of the invention, and that is to bind a high proportion of filaments into each elongated granule 46 and maintain them throughout the chopping process and any subsequent blending steps in high speed, high throughput machines. The adhesive preferably will be used also in an amount which is not substantially in excess of that which maintains the fiber bundle integrity during chopping. This amount will vary depending on the nature of the fibers, the number of fibers in the bundle, the fiber surface area, and the efficiency of the adhesive, but generally will vary from 2.5 to 32.5% and preferably from 5 to 15% by volume of the granule.

For uniform adhesive pick up on the fibers in the bundle it is preferred to use a small, but effective amount of a conventional surface active agent, which facilitates wetting and bonding to numerous different substrates. Anionic, cationic and non-ionic surfactants are suitable for this purpose, the only requirement being that they be miscible with any solvent system used for impregnation and compatible with the thermoplastic film forming adhesive combination. Preferred surfactants, especially when graphite, or metal coated carbon fiber substrates are used, comprise anionic surfactants especially sodium salts of alkyl sulfuric acids. Particularly useful is sodium hepadecyl sulfate, sold by Union Carbide Co., under the Trademark NIACET ® No. 7.

Careful consideration should be given to selection of the film forming thermoplastic adhesive combination, subject to the above-mentioned parameters. Some adhesives are more efficient than others, and some, which are suggested for use as fiber sizings in the prior art will not work. For example, poly(vinyl acetate) and poly(vinyl alcohol), the former being suggested by Bradt in U.S. Pat. No. 2,877,501, as a sizing, do not work herein because, it is believed, thermosetting or cross linking occurs and this operates to prevent rapid melting and complete dispersion in the injection molding machine. While such materials are suitable for the resin rich compounded granules used in the Bradt patent, they are unsuitable herein.

Much preferred for use herein is a combination comprising poly ($C_2$–$C_6$ alkyl oxazolines) and poly (vinylpyrrolidone). The former is somewhat structurally related to N,N-dimethylformamide (DMF) and have many of its miscibility properties. A readily available such polymer is poly(2-ethyl oxazoline), Dow Chemical Co. PEOx. This can also be made by techniques known to those skilled in this art. Poly(2-ethyl oxazoline) is thermoplastic, low viscosity, water-soluble adhesive. It can be used in the form of amber-colored and transparent pellets 3/16" long and ⅛" diameter. Typical molecular weights are 50,000 (low); 200,000 (medium) and 500,000 (high). Being water soluble, it is environmentally acceptable for deposition from aqueous media. It also wets the fibers well because of low viscosity. It is thermally stable up to 380° C. (680° F.) in air at 500,000 molecular weight. Poly(vinylpyrrolidone) is an item of commerce, being widely available from a number of sources, and varying in molecular weight, as desired. While the poly(oxazoline) appears to provide dispersibility to the elongated bundles, the poly(vinylpyrrolidone) is useful for high temperature resistance. Like the oxazoline, poly(vinylpyrrolidone) works well in water based impregnation media. Typical molecular weight ranges readily availabe can be used, for example 10,000; 24,000; 40,000; and 220,000. The higher molecular weight material tends to provide bundles which are more difficult to disperse. On the other hand, the lowest molecular weight causes some loss in heat resistance. However, within the foregoing parameters, the adhesive combination on fiber bundles does not fracture appreciably during chopping to minimize free filaments from flying about, which can be a safety hazard. When blended with pellets 48 of a thermoplastic resin system, the adhesive combination will melt readily allowing complete dispersion of the fibers throughout the resin melt while in a molding machine. However, pellets 46 bound with this thermoplastic adhesive combination are indefinitely stable with the resin pellets 48 during blending, and don't break apart prematurely.

As a result of a number of trials, his aspect of the invention as currently practiced provides optimum results when the following guidelines are adhered to:

The fiber type can vary, any fiber being known to be useful as a filler or reinforcement in a resin system can be used. Preferred fibers are carbon or graphite fibers, glass fibers, aramid fibers, ceramic, e.g., alumina or silica carbide, fibers, metal coated graphite fibers, or a mixture of any of the foregoing.

The preferred thermoplastic adhesive component (a) comprises poly(ethyloxazoline), having a molecular weight in the range of about 25,000 to about 1,000,000, preferably 50,000–500,000, most preferably about 50,000.

The preferred thermoplastic adhesive component (b) comprises poly(vinylpyrrolidone), having a molecular weight in the range of from about 10,000 to about 220,000, preferably from about 24,000 to about 40,000 and most preferably about 24,000.

It is preferred that the adhesive be deposited onto the filaments from a solvent system which can comprise any polar organic solvent, e.g., methanol, or mixture of such solvents, or water, alone, or in admixture. Acceptable bath concentrations for the thermoplastic adhesive can vary but is generally for component (a) it is in the range of 2.5–12% by weight, preferably 2.5–8%, and especially preferably 4–8% by weight and, for component (b), in the range of 1–8% by weight, preferably 1–6% by weight, and, especially preferably, 1–4% by weight.

If a surface active agent is used, this too can vary in type and amount, but generally if an anionic alkyl sulfate is used, such as sodium heptadecyl sulfate, bath concentrations can range from 0.0005–0.5% by weight, preferably from 0.0005 to 0.05%, and most preferably, 0.0005–0.005%, by weight.

The amount of non-filament material in the filament-containing granules 46 of the invention will vary, but, in general, will range from 2.5 to 32.5% by volume with any fiber, preferably from 5 to 15% by volume.

The amount of component (b) will be from about 7.5 to about 75% by weight based on the combined weights of (a) and (b) preferably from about 15% to about 50%.

The length of the elongated granule 46 will generally range from ⅛ to ⅝ inch, preferably from ⅛ to ¼ inch. The diameters of each elongated granule 46 can vary, depending primarily on the number of filaments and the thicknesses will vary from about one-forty eighth to about three-sixteenths inch in diameter. Preferably, the diameter will be in the range of from about one-thirty-second to about one-eighth inches.

Numerous thermoplastic resins can be employed with the elongated granules of the present invention. In general any resin that can be injection molded and that can benefit from a uniform dispersion of fibers can by used. For example polystyrene, styrene/acrylic acid copolymer, styrene/acrylonitrile copolymer, polycarbonate, poly (methyl methacrylate) poly(acrylonitrile/-butadiene/styrene), polyphenylene ether, nylon, poly(1,4-butylene terephthalate), mixtures of any of the foregoing, and the like, can be used.

It is preferred to manufacture the injection molding composition 46 of this invention by a continuous process. A suitable apparatus is shown in FIG. 5*a*. Typically, bundles of filaments, such as graphite fiber tows 2 or metal coated graphite fiber tows 30, 3,000 to 12,000 filaments per bundle, glass yarns, 240 filaments to a strand, or stainless steel tow, 1159 filaments per bundle, are drawn from storage roller 32 and passed through one or more baths 34, containing the thermally stable, film forming thermoplastic adhesive in a solvent medium, e.g., water, to impregnate the filaments, then through means such as die 36, to control pick up. The impregnated filaments thereafter are passed into a heating zone, e.g., oven 38, to evaporate the solvent, e.g., water and then to flux the thermoplastic adhesive. The treated filaments 40 are withdrawn from the heated zone, transported to chopper 42 and cut into fiber pellets 46 illustratively varying beteen ⅛–¼" according to the requirements of the particular apparatus. The pellets 46 are then stored in a suitable container 44 for subsequent use. Any surfactant conveniently is included in a single bath with the adhesive. It will be observed that this procedure results in the orientation of the reinforcing fibers along one axis of the granule 46.

To carry out the molding method of the present invention, a flow diagram in the general form illustrated in FIG. 5*b* is preferably employed. Fiber pellets 46 are mixed with resin pellets 48 to produce a blended mixture 50. This is added to conventional hopper 52 on molding press 54. When passing through cylinder 56, prior to being forced into mold 58 a uniform dispersion of the fibers is accomplished. Removal of molded article 60 provides a fiber reinforced item produced according to this invention.

It is understood that other plasticizers, mold lubricants, coloring agents, and the like, can be included, and that the amount of reinforcement in the components can be varied according to well understood techniques in this art.

DESCRIPTION OF THE PREFERRED EMBODIMENTS

The following examples illustrate the present invention. They are not to be construed to limit the claims in any manner whatsoever.

EXAMPLES 1-7

A batch process of this invention was used for the following examples. By first electrolessly depositing copper for predetermined times then electrodepositing for a variety of residence times, a variety of copper coating thicknesses could be produced on the fibers. The carbon fiber used was Magnamite ® IM-b 6, 12K, no size, no twist, supplied by Hercules, Inc., Magma, Utah. The fibers were prepared for coating using above-described wetting Bath 1 and sensitizing Bath 2, and separate samples of fiber tows were immersed in the electroless plating Bath 3 for 0, 1, 3 or 5 minutes. These samples were then electroplated, using above-described Bath 5 for various times as given in the chart below. The thickness of a fiber's coating was measured and is included below.

| EXAMPLE | ELECTROLESS TIME (min) | ELECTROLYTIC TIME (min) | COATING THICKNESS (microns) |
|---|---|---|---|
| A (control) | 0 | 5 | 0 |
| 1 | 1 | 3 | 0.93 |
| 2 | 3 | 1 | 0.28 |
| 3 | 3 | 3 | 0.91 |
| 4 | 3 | 5 | 2.63 |
| 5 | 5 | 0 | 0.83 |
| 6 | 5 | 3 | 0.53 |
| 7 | 5 | 5 | 2.31 |

Control sample A did not electroplate due to the lack of an electroless copper layer. Coating thickness in Example 6 is anomously low, it may have been that an unrepresentative fiber was measured.

EXAMPLE 8

Figure 3A:
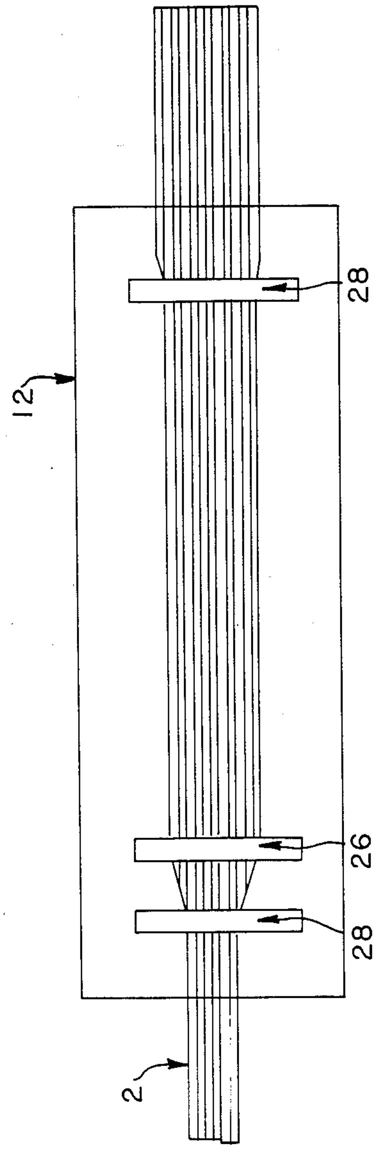
FIG. 3a is a top plan view of a beater bar arrangement preferred for use in the present invention.
Figure 3B:
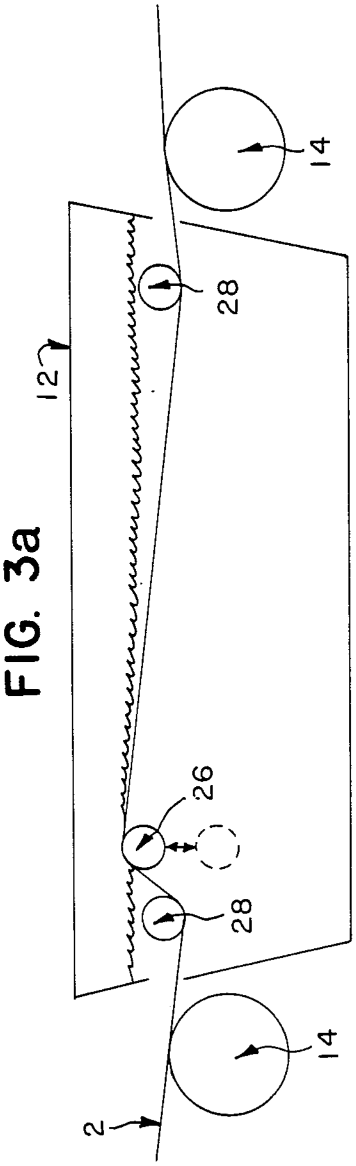

Using the continuous plating line described in the specification above, and diagrammed in FIGS. 1-3, three tows of graphite fiber IM-6 (12K) were copper coated at a rate of three inches a minute using above-described Baths 1, 2, 4 and 5. The temperature of the electroless bath was 45° C. and the temperature of the electrolytic baths were 53° C. The current in the first tank was 5 amperes, the second tank current was 30 amperes and the final tank was 12.5 amperes. The coating continuity, thickness, and degree of fiber agglomeration were measured by scanning electron microscopy (SEM) of cross sections of the tows imbedded in epoxy resin and polished in accordance with standard procedures. The results are summarized in the following table.

| | |
|---|---|
| % Agglomerated fibers | 26 |
| Range of coating thickness | 1.4-2.8 microns |
| Distribution of coating thickness between 1-2 microns | 99% |
| % Single fibers | 74 |

EXAMPLES 9 AND 10

A batch process of this invention used Baths 1, 2, 4 and 5 described above to successively coat 12K tows of IM-6 graphite fiber with copper. Both tows were held in Bath 4 for 5 minutes. Example 9 was electroplated for 5 minutes at 2.5 amperes. Example 10 was electroplated for 10 minutes at 2.5 amperes. A photomicrograph of Example 9 appears herein as FIG. 6. SEM analysis of cross sections of the two tows showed the following:

EXAMPLE 9

| | | | | | | | |
|---|---|---|---|---|---|---|---|
| Evenness around circumference: | | | | | | | Excellent |
| Minimum thickness: | | | | | | | 0.50 microns |
| Maximum thickness: | | | | | | | 0.81 microns |
| Average thickness: | | | | | | | 0.64 microns |
| Standard deviation in thickness (fiber-to fiber): | | | | | | | 0.08 microns |
| Agglomeration: | | | | | | | |
| Number of fibers in each agglomerate: | 1 | 2 | 3 | 4 | 5 | 6 | greater than 6 |
| Percent of fibers: | 82 | 12 | 3 | 4 | 1 | 0 | 1 |

EXAMPLE 10

| | | | | | | | |
|---|---|---|---|---|---|---|---|
| Evenness around circumference: | | | | | | | Excellent |
| Minimum thickness: | | | | | | | 0.59 microns |
| Maximum thickness: | | | | | | | 1.07 microns |
| Average thickness: | | | | | | | 0.77 microns |
| Standard deviation in thickness (fiber-to fiber): | | | | | | | 0.11 microns |
| Agglomeration: | | | | | | | |
| Number of fibers in each agglomerate: | 1 | 2 | 3 | 4 | 5 | 6 | greater than 6 |
| Percent of fibers: | 79 | 12 | 3 | 3 | 2 | 0 | 1 |

EXAMPLES 11 AND 12

Figure 4:
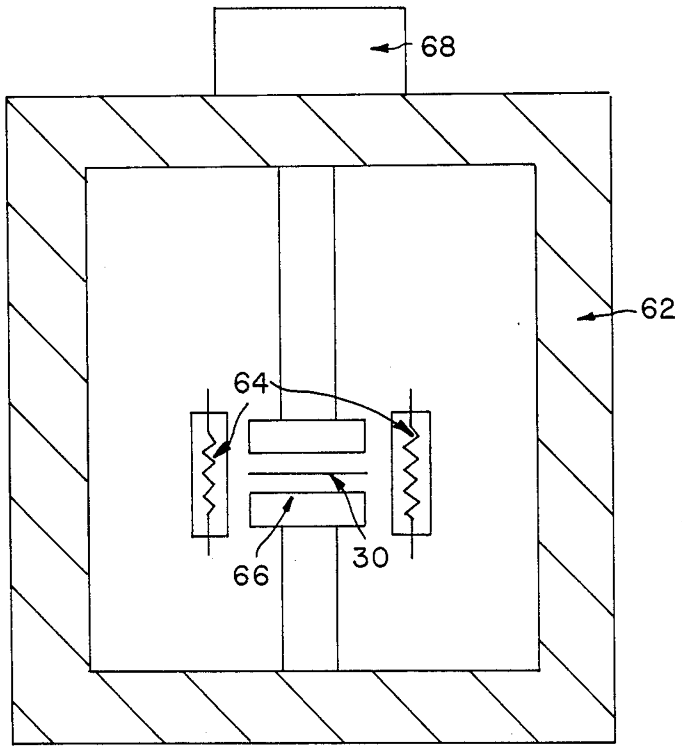
FIG. 4 is a schematic view of a hot press apparatus suitable for use in the present invention.

Copper coated carbon fibers were prepared using the continuous process described in Example 8 using Baths 1, 2, 4 and 5. Two base fibers were used: 12K IM-6 graphite fiber (Hercules Co., Magma, Utah), and 2K P100 graphite fiber (Union Carbide Co., Danbury, Conn.). Coatings were applied in thicknesses sufficient to yield approximately 50% by volume of copper. The coated fiber tows were then aligned by hand into layers to form unidirectionally aligned samples 1×8 inches. Hot pressing was performed in a large hot press, as shown in FIG. 4, at a heat of between 750° to 775° C. under a pressure of 1000 psi. The hot press comprised a press frame 62, furnace elements 64, a press platen 66, and a hydrolic ram 68. The coated fibers 30 were placed between the platen 66 and ram 68 for hot pressing. Composite panels were measured for electrical resistivity, thermal conductivity and coefficient of thermal expansion. Thermal expansion was measured using push rod dilatometry. An axial rod technique, corrected for radial temperature loss, was used to measure thermal conductivity. A four point bend technique was used to measure the electrical resistivity. All measurements were made parallel to the fiber axis. All of the hot pressed samples appeared to be well consolidated. High fiber volume fractions, with low void contents, were obtained with both IM-6 and P100 carbon fibers. Individual ply thicknesses were as low as 5 mls in these samples. The results of the tests are given below:

| | 11 | 12 |
|---|---|---|
| Fiber/Matrix | IM-6/Copper Composite | P100/Copper Composite |
| Electrical Resistivity (micro-ohm meter) | 0.050 | 0.035 |
| Thermal Conductivity (Watts/mK) | 194 | 454 |
| Coefficient of Thermal Expansion (× 10 −6/°C.) | 5.00 | 2.00 |

These values are what would be predicted by rule-of-mixture calculations, demonstrating uniformity, a low void content, and a high purity coating.

EXAMPLE 13

A composite is prepared by chopping the fibers of Example 8 into short lengths, ⅛" to ¼", then thoroughly mixing with thermoplastic nylon polyamide in an extruder, and chopping the extrudate into molding pellets in accordance with conventional procedures. The pellets are injection molded into plaques 4"×8"×⅛" in size. The plaque is reinforced by the copper coated fibers. By virtue of the metal content, it also does not build up static charge, and it can act as an electrical shield in electronic assemblies.

EXAMPLE 14

Bundles of copper plated graphite fibers of about one inch in length prepared according to the procedure of Example 8 are mixed 1:9 with uncoated graphite fibers and laid up into a non woven mat, at 1 oz./1 sq. yard. The mat has a metal content of about 10% by weight of copper and can be impregnated with thermosetting resin varnishes and consolided under heat and pressure into reinforced laminates having high strength and excellent electrical dissipation properties.

EXAMPLE 15

Long, copper coated graphite yarns prepared by the general procedure of Example 8 are pultruded at a high rate with molten lead in an apparatus from which a ⅛" diameter rod issues in solidified form, down through the center of which runs the copper coated graphite fibers. A reinforced composite having a lead matrix according to this invention will be obtained.

EXAMPLE 16

The following example illustrates the preparation of a comminuted copper coated graphite fiber filled epoxy resin film as a conductive surface ply for laminates. A solution of catalyzed formulated epoxy resin system (American Cyanamid FM® 300) dissolved in a 50/50 v/v mixture of ethylene dichloride and methyl ethyl ketone at 78–80% solids is prepared in a 1 gallon capacity Ross Planetary mixture. 30% by weight of copper plated graphite fiber prepared in accordance with Example 8 herein and chopped into 1/64 inch lengths is added to the mixer and the composition mixed until the copper fibers are uniformly dispersed throughout. The composition is degassed by stirring at a reduced pressure of 20 mm Hg for 15 minutes. The epoxy resin-chopped fiber composition is coated onto a sheet of silicone treated kraft paper with the "knife over roll" coater to a thickness of approximately 12 mils. The coated kraft paper sheet is dried in an oven by gradually heating to about 190° F. and the 190° F. temperature was maintained for approximately 40 minutes. A dry, filled polymer film according to this invention is produced. The laminate is prepared with the polymer film prepared above as surface ply following standard procedures. The lay-up contains 12 layers of a commercial prepreg which is bagged and cured in the cured in the autoclave at 350° F. for 120 minutes at 20–50 psi. The finished laminate has a uniform smooth surface suitable for final application without further finishing operations. When tested in accordance with ASTM 0257-78, the surface ply has a very low surface resistivity.

EXAMPLE 17

The following illustrates the use of the composition of the invention as a conductive molding compound.

A polyester molding compound is prepared by charging the following reactants to a sigma mixer:

10.5 parts styrenated, thermosettable polyester resin (USS Chemical MR 13017);

12.3 parts styrenated thermosettable polyester resin (USS Chemical MR 13018);

0.6 parts calcium stearate;

40.3 parts calcium carbonate;

0.5 parts t-butyl perbenzoate; and 0.06 parts inhibitor (35% hydroquinone in dibutylphthalate).

After mixing for 15 minutes, 25.7 parts of copper plated graphite fibers (Example 8) chopped to ¼ inch length are blended into the mix for 10 minutes. The resulting polyester premix is molded into 4 inch circular plaques in a molding press at 150° C. The plaques have a very low surface restivity due to their content of metal coated fiber. Because of the excellent thermal conductivity of the compositions like those of Examples 16 and 17, they find utility also for constructing tools for use in molding. Such tools, because of their unique characteristics, permit shorter cycle times as a result of their more rapid heat build up and cool down. In contrast, tools made with conventional materials require much longer cycle times.

EXAMPLE 18

Chaff according to the present invention is prepared by chopping strands of composite fibers metal coated as described in Example 8 into lengths designed to effectively reflect impinging radar waves. Preferably, the fibers are cut to a length roughly one-half the wavelength of the radar frequency the chaff is intended to be used against or, where very high radar frequencies are encountered, full wavelengths. In practice, a radar operator may be monitoring several frequencies, typically in the 2–20 GHz range. Therefore, strategic chaffs according to this invention are made to contain different lengths of filament ranging from several centimeters and shorter (e.g., 0.01–10 cm), corresponding to the halfwave lengths (or full wavelengths) over an entire bandwidth, the range that may be achieved with the chaff of this invention is from 100 microns to hundreds of meters, depending on the specific use contemplated.

EXAMPLE 19

Using an apparatus of the type generally shown in FIG. 5*a* a bath comprising the following is formulated:

| Component | % by weight |
|---|---|
| poly(ethyl oxazoline), MW 50,000 | 6.0 |
| poly(N—vinylpyrrolidone), MW 24,00 | 4.0 |
| sodium heptadecyl sulfate* | 0.001% |
| water | 89.899 |

*NIACET ® No. 7 surfactant

With reference to FIG. 5*a*, a tow of continuous graphite fibers 30 (12,000 count) each of which has a copper coating thereon is led through bath 34. The graphite filaments each average about 7 microns in diameter. The copper-coating thereon is approximately 1.0 microns in thickness. The copper coated graphite tows 30 are prepared by continuous electroless plating followed by electroplating in accordance with the procedure described in Example 8. After passing through coating bath 4 the treated fibers are passed over grooved rollers 36 to remove excess adhesive then passed through oven 38 at about 300° F. The impregnated filaments then are chopped to ¼" lengths in chopper 42 and there are produced elongated granules of approximately 1/16" in diameter of cylindrical shape and form. The non-filament material content is 9% by volume.

EXAMPLE 20

Using the process generally shown in FIG. 5*b*, sufficient amounts of the elongated pellets 46 produced in Example 19 are blended with pellets 48 of a thermoplastic molding resin composition comprising poly(bisphenol A carbonate) (Mobay Co. MERLON ® 6560) to provide 5 weight percent of copper-coated graphite filaments in blend 50. The blended mixture is molded in injection molding press 58 into work pieces 60 suitable for physical and electrical testing. The electromagnetic shielding effectiveness (SE) and EMI attenuation are measured and show high dispersion efficiency.

EXAMPLE 21

The procedure of Example 20 is repeated substituting for the thermoplastic resin pellets, pellets comprising poly(acrylonitrile/butadiene/styrene) (Borg Warner CYCOLAC ® KJB) resin and plaques suitable for measuring SE effect are molded.

EXAMPLE 22

The procedure of Example 20 is repeated but poly(2,6-dimethyl-1,4-phenylene ether)-high impact strength rubber modified polystyrene resin pellets (General Electric NORYL ® N-190) are substituted, and plaques suitable for measuring SE are prepared.

EXAMPLES 23 AND 24

Figure 17:
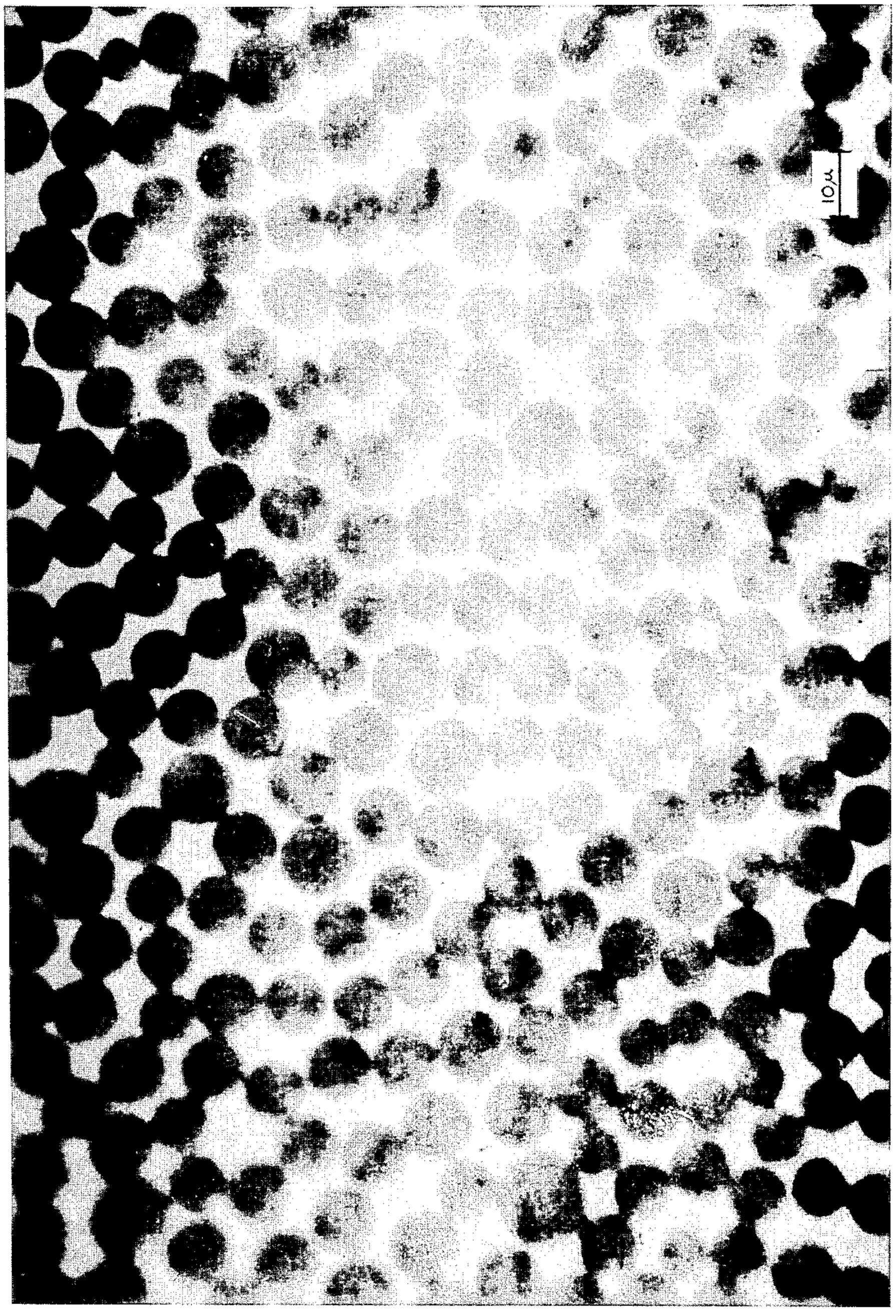
FIG. 17 is a cross-sectional view of consolidated copper coated fibers of the present invention in a uniaxial configuration cut perpendicular to the fiber length.
Figure 18:
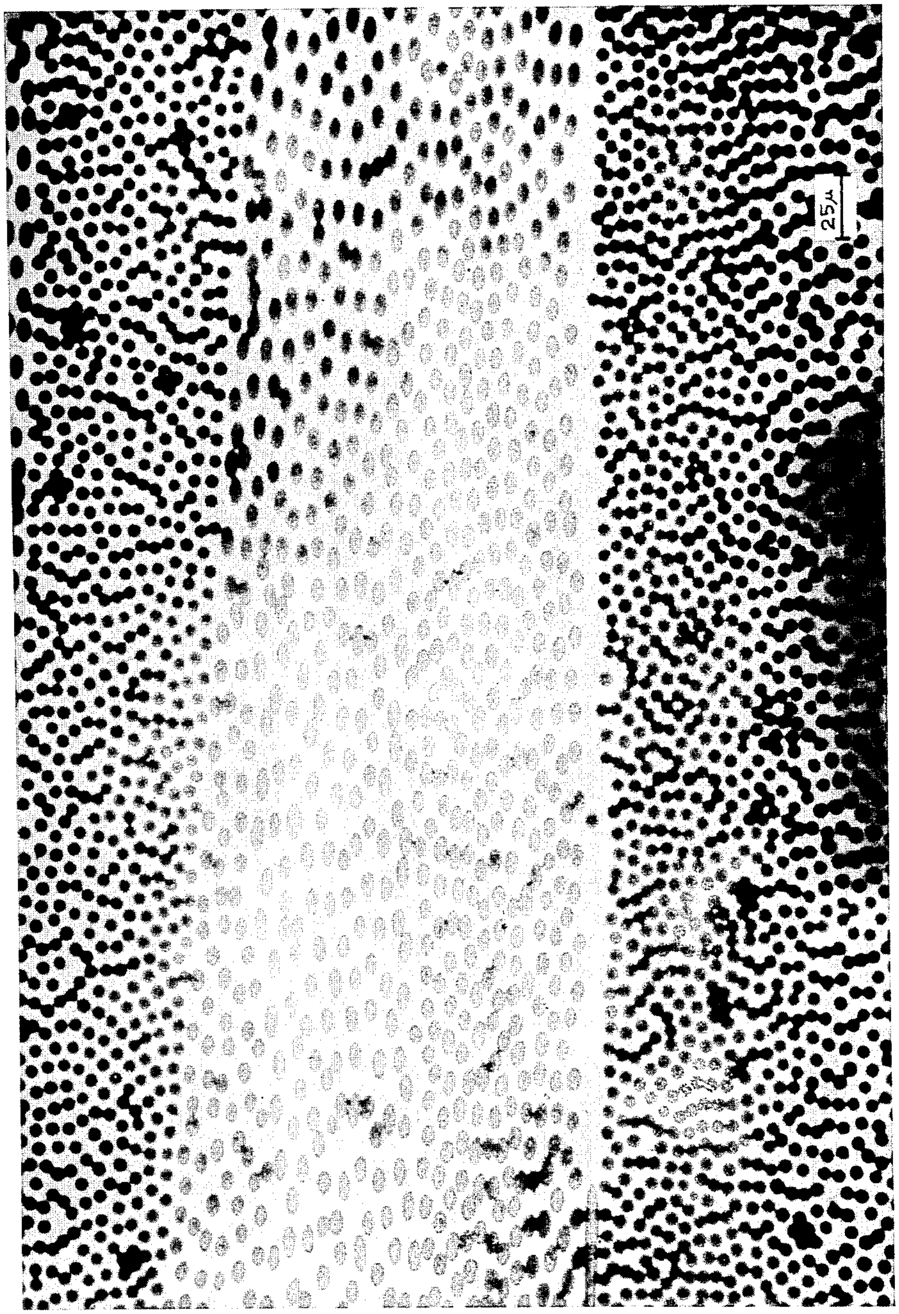
FIG. 18 is a cross-sectional view of consolidated copper coated fibers of the present invention in a cross-plied configuration.

The general procedure of Examples 9 and 10 was repeated using IM-6 for Example 23 and P-55 for Example 24. The IM-6 fiber was coated to contain 50 vol. % of copper; and the P-55 was coated to contain 40 vol. % of copper. The respective fibers were hot pressed for 10 min. at 900° C., 1000 psi under a purge of 3% hydrogen and 97% nitrogen gas. FIG. 18 is a photomicrograph of the IM-6 coated with 50 volume percent copper that has been consolidated into a "cross-plied" laminate, that is, the fibers in the center layer are at approximately a 60 degree angle to the polish plane, while in the top and bottom layers, the fibers are perpendicular to the polish plane. FIG. 17 is a higher magnification photo of P-55 coated with about 40% copper. In this laminate all the fibers shown are oriented perpendicular to the polish plane.

For comparison purposes, a number of copper plated graphite fibers are prepared by techniques of the prior art and compared with those produced according to the present invention.

COMPARATIVE EXAMPLE 1A

Direct electroplating of an untreated tow of graphite fibers was attempted using a commercially available copper electroplating bath. The plating solution used was Bath 5, described above. The graphite fiber used was P100 from Union Carbide (2,000 filament, no size, no twist). This graphite fiber was believed to have sufficient electrical conductivity to allow the eletrodeposition of copper. A 1 liter graduated cylinder was filled with 1 liter of Bath 5. The bath was heated to 45° C. by means of a heating tape wrapped around the cylinder. The tape was plugged into a variable voltage controller and then monitored by a thermometer hung on the inside of the cylinder. Two long rectangles of OFHC grade copper sheet stock (high purity copper) were hung in the bath by bending one end of the sheet over the side of the cylinder. The sheets were connected to a power supply to serve as cathodes. The P100 fiber was wrapped around a piece of copper bar stock which rested on the top of the graduated cylinder. The fiber was then clamped to the bar and connected to the power supply as the anode. Using a current of 1 ampere, plating was carried out for five minutes. The fiber was then rinsed with deionized water and dried in a vacuum oven for 15 min. at 120° F. at a vacuum of 25 mm of Hg. Visual inspection of the fiber showed plating to be sporadic and uneven. The material was considered to be unsuitable for hot pressing.

COMPARATIVE EXAMPLE 2A

Sizing was removed from commercially available P100 graphite fiber (2,000 filaments, no twist, sized) using a procedure specified by the fiber's manufacturer, Union Carbide, by heating at 400° C. for 30 sec. in air. One liter of each solution was placed in a graduate cylinder. The following solutions were used: Bath 1 was a wetting agent solution as described above at room temperature, Bath 2 was a catalyst solution, described above, at room temperature, and Bath 3 was an electroless copper plating solution, described above, at 45° C. The last bath was aerated by means of a gas dispersion tube which was connected to a compressed air line. Six bundles of fibers, each 2.5 inches long, were immersed in Bath 1 for 2 min., agitated manually, and rinsed using deionized water. The fibers were then agitated in Bath 2 for 2 min., and again rinsed. Rinsing was continued until the run-off from the fibers was clear and colorless. The individual bundles were then separately electrolessly plated in Bath 3 for 1, 5, 10, 15 and 30 minutes. An attempt was made to plate the sixth tow for one hour, however the plating bath became unstable and began to precipitate out and the experiment was discontinued. The fibers were then dried in a vacuum oven. The resulting fibers were mounted for Scanning Electron Microscopy (SEM) and the coating thicknesses were measured. The thicknesses ranged from 0.3 microns for the 1 min. residence time to 3.0 microns for the 30 min. residence time. It was noted that the coating began to have nodular growths after 10 min. in the plating solution. At 10 minutes the coating thickness was 1.8 microns.

COMPARATIVE EXAMPLE 3A

Figure 7:
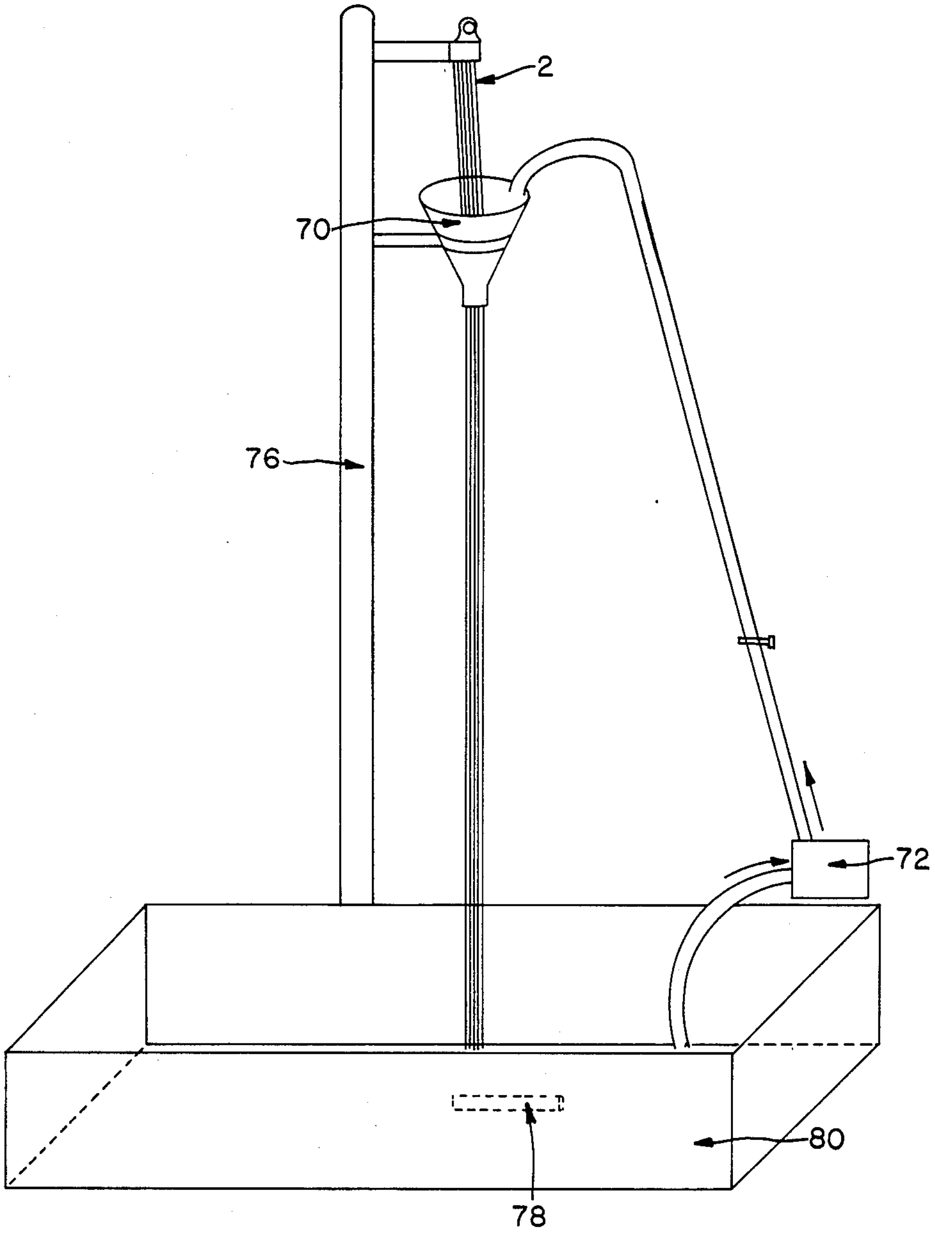
FIG. 7 is a schematic view of a fiber plating apparatus used in the electroless deposition of metal under Schmitt, German Pat. No. 2,658,234.

The process described in German Pat. No. 2,658,234 is said to guarantee the uniform coating of individual very thin fibers with a metallic coating, such as copper. The patent diagrams an apparatus which is comprised of a funnel 70 through which a tow of graphite fiber 2 is suspended. Various solutions are then pumped into the funnel and flow down the tow and causing it to be spread. The principal requirements of the apparatus are: a pump 72, capable of attaining a flow of 1 liter/min., and a funnel 70 having an inner diameter of between 3 and 12 times the outer diameter of the tow 2 to be coated. The height of the liquid in the funnel 70 must be 2 cm or more. The advantage of this particular method is slated to lie in the fact that the individual fibers spread out from one another in the stream of the reaction fluid flowing along them. The patent teaches that this will produce fibers which will be uniformly coated over both the length and the cross section. The rate of flow along the fiber length is stated as being important along with keeping the turbulence in the flow to a minimum. Detailed instructions as to the pumping times for each component and water rinses are given. Unfortunately, the commercial electroless plating solution used by the German patentee, Schmidt, made by the Shipley company is no longer available. Therefore, substitute solutions recommended by the same manufacturer were used. A diagram of the apparatus is given in FIG. 7. A magnetically driven plastic pump 72 (Teel) was used to pump solution into a plastic funnel 70. The pump's flow was restricted by an adjustable hose clamp 74. Flow was adjusted to 1 liter per minute. The i.d. of the bottom opening of the funnel 70 was 0.5 cm. With a pumping rate of 1 liter/min., and this funnel 70, it was possible to maintain a solution level height of 5 cm in the funnel 70 when a tow of fibers 2 was suspended through the funnel opening. One meter of carbon fiber (12,000 filament tow of IM-6 fiber from Hercules, no size, no twist) was hung from the top of a ring stand 76. The fiber used by Schmidt had five twists per meter. Therefore, five twists were made in the fiber tow 2. The bottom of the tow 2 was run through a 5 cm. long glass tube 78. The glass tube 78 did not create tension in the tow 2, but gently rested on the bottom of the catch basin 80 to keep the fiber from untwisting. All of the water used was deionized water, including the water which was used to rinse the fiber. The treatment of the fiber was as follows:

10 min. using Shipley Conditioner 1160B;
5 min. rinse with deionized water;
1.5 min. with 25 vol. % HCl in deionized water;
3.5 min. with Shipley Catalyst 9F;
5 min. rinse with deionized water;
5 min. with Shipley Accelerator 19;
5 min. rinse with deionized water;
12 min. using a Shipley electroless copper plating solution which was prepared by combining 79 vol. % deionized water, 11 vol. % Shipley CP-78M, 4.5 vol. % Shipley CP-78R, heating to 115° F. then adding 5.5 vol. % Shipley CP-78B; and
5 min. rinse with deionized water.

Figure 10:
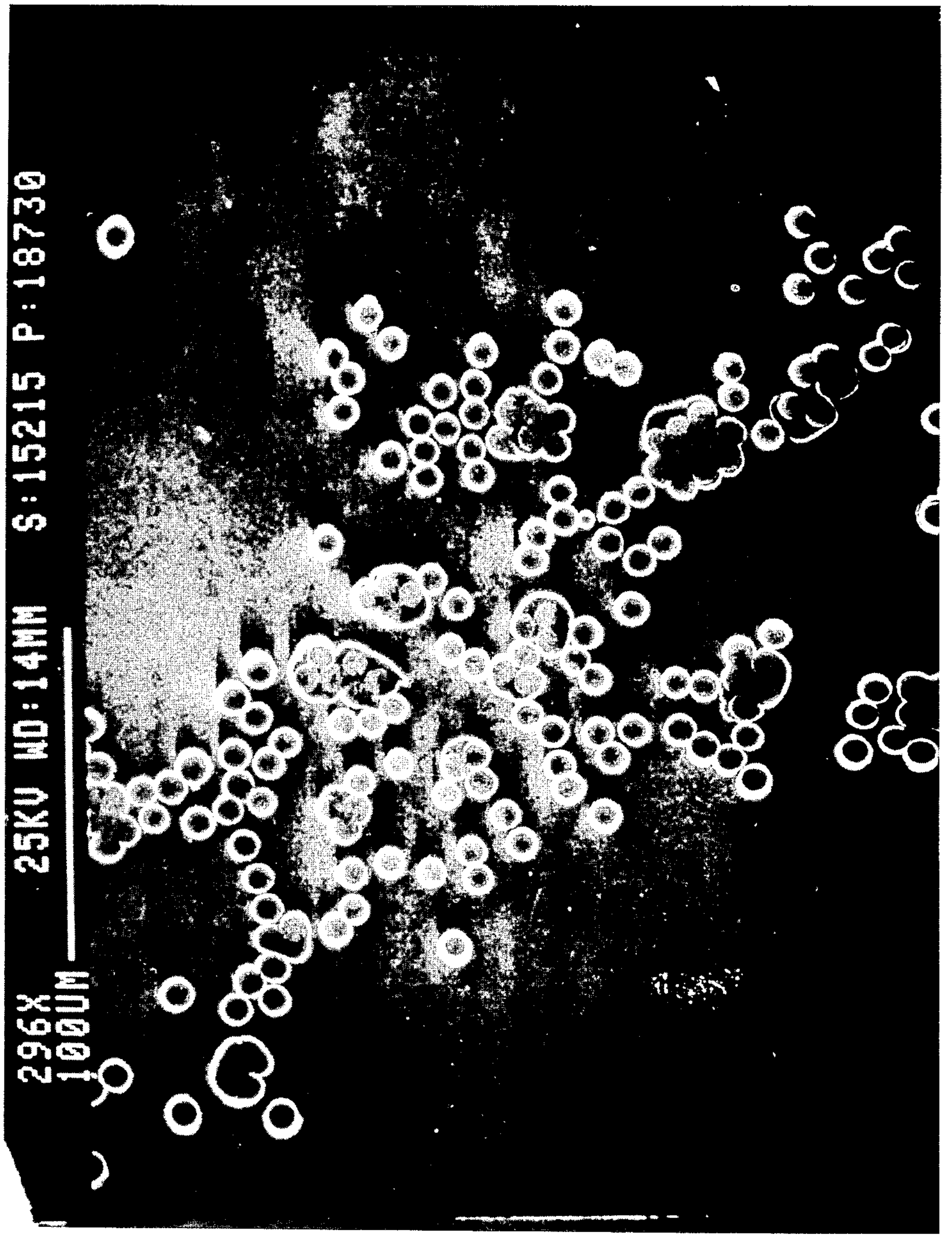
FIG. 10 is a cross-sectional view of copper coated fibers of Schmitt, German Pat. No. 2,658,234, in a resin matrix, cut perpendicular to the length of the fibers.

When using the heated solution, a small glass evaporation dish was substituted for the polypropylene tank and a heating plate was beneath it to maintain the temperature of the solution. The fiber was dried using a vacuum drying oven at 120° C. for 15 min. at a vacuum of 25 mm of Hg. The apparatus caused the loosely suspended fiber to fill with solution and spread. The twists induced into the fiber in order to duplicate Schmidt's example remained in the tow 2 during the experiment until the glass dish and hot plate were substituted for the polypropylene tank. At that point the fiber was allowed to untwist. The final solution was pumped through the fiber without twists. This allowed the fiber to fill with solution more completely, however, one area about 20 cm from the bottom of the tow 2 showed some evidence of constraint. Visual analysis later showed the presence of a "wrapper" or errant fiber (or several fibers) which wrapped around the tow 2 and bound it together. The passive nature of the spreading of the fibers by the solution flow in this technique does not overcome such a constraint. When circulating the final solution, evidence of copper deposition was seen almost immediately. Copper deposition was evidenced by an immediate color change as well as considerable hydrogen evolution in the tow 2. After completion of the final rinse the fiber was dried and visually inspected. Evidence was seen of one black section in the center of the fiber approx. 20 cm. from the bottom of the tow 2. This area corresponded to the section which was believed to contain a "wrapper". The coated fiber 30 appeared very bright and copper colored and felt soft to the touch, although the fiber did not seem completely free. This could indicate some evidence of "overplating" or the plating together of neighboring fibers (agglomeration). On examination by Scanning Electron Microscopy (SEM) it wa found that fibers in the tow 2 had coatings that were uneven in thickness around the circumference, varying from 0.8 to 3.5 microns on the same fiber. A typical view is shown in FIG. 10. Thickness variations were also seen from fiber to fiber in the coated tow 30. Near the outside of the coated tow 30 fibers were coated to a thickness of 2.5 microns while in the center of the coated tow 30 coatings as thin as 0.2 microns were seen. The tows 30 were also highly agglomerated having only 43% of the fibers in a cross section individualized. The agglomeration was characterized by counting the number of agglomerates containing 1, 2, 3, 4, 5, 6, or greater than 6 fibers. The percentage of all fiber contained in agglomerates of each size was then calculated. The results are shown below:

| Number of fibers in each agglomerate: | 1 | 2 | 3 | 4 | 5 | 6 | greater than 6 |
|---|---|---|---|---|---|---|---|
| Percent of fibers: | 43 | 19 | 9 | 5 | 4 | 5 | 15 |

COMPARATIVE EXAMPLE 4A

In Sakovich et al., referred to above, a method is given of electrolessly plating carbon fibers. Both nickel and copper coatings were applied to tows of graphite fiber with between 1,500 and 10,000 filaments. The diameter of the fibers were between 6.5 and 10 microns. The fibers were first treated with boiling water, a stannous chloride bath, then a palladous chloride bath before electroless plating. No residence times or concentrations were given for the solutions. No apparatus was described. For copper plated fibers, the authors state that a bright coating, uniform in thickness on all fibers of the tow, was obtained from the following electrolyte: A: 170 g/L Seignette salt [potassium sodium tartrate], 50 g/L sodium hydroxide, 30 g/L sodium carbonate; B: 40 percent formaldehyde solution; A:B=5:1 (pH 12.3, Temp. 20° C.). The average precipitation rate was 0.03 microns/min. It should be noted that the above solution for the electroless deposition of copper does not include any chemical which contains copper in any form. It was therefore assumed that this ommission was a typographical error or that Sakovich might have been familiar with, a reference text edited by F. A. Lowenheim was consulted (*Modern Electroplating,* Third Edition, ed. F. A. Lowenheim, John Wiley & Sons, Inc., New York, 1974, pp. 734–739). A bath which is very similar to the one used by Sakovich is described on p. 736, Bath 4. When compared it was seen that if the components were multiplied by a factor of 6/5 the proportions of the given components were identical to those Sakovich used.

| | Bath 4 of Lowenheim | Sakovich |
|---|---|---|
| $CuSO_4.5H_2O$ | 29 | omitted |
| K Na Tartrate (g/L) | 142 | 170 |
| NaOH (g/L) | 42 | 50 |
| $Na_2CO_3$ (g/L) | 25 | 30 |
| Formaldehyde (37%) (ml/L) | 191 | |
| Formaldehyde (40%) (ml/L) | | 167 |

The Lowenheim solution also included 17 g/L of Versene-T (EDTA+triethanolamine), however, since this compound was not indicated by Sakovich it was not used in the preparation of the electroless plating bath of this example. The exact compositions and concentrations for the stannous and palladous chloride baths were not given so commercially available solutions for the chemical deposition of copper were used. These solutions are commonly used in the printed circuit board industry.

A tow of graphite fibers (12,000 filament IM-6 from Hercules, no size, no twist) was used to perform the experiment. A loop of fiber, 40 in. long, was taped to a frame made by bending a glass rod to form a rectangle. This frame held the fiber and kept it from floating to the surface when immersing it in solution. This is especially important when the fiber is placed in the copper containing solution since the production of hydrogen gas on the fiber forces it to the surface of the bath. Four 1 liter graduated cylinders were obtained to hold the reaction solutions. Water was heated to boiling in an Erlenmeyer flask on a hot plate. The water was then poured into the first graduated cylinder. This cylinder was warmed by means of a heating tape wrapped around the cylinder. The fiber was immersed in the hot water for five minutes. In this time period the water temperature fell to 92° C. The fiber was then transferred to the second cylinder containing a stannous chloride solution (Shipley Accelerator 19) for 5 min. The fiber was then rinsed with deionized water for 2 min. After rinsing, the fiber was placed in a palladous chloride solution (Shipley Catalyst 9F) for 5 min. The fiber was again rinsed for 2 min. with deionized water. At the end of the two min. rinse, the run-off from the fiber appeared colorless and free of catalyst. The fiber was then placed in the cylinder containing the electroless plating solution. This solution was made in the following manner (as outlined in Lowenheim):

35 g of copper sulfate pentahydrate ($CuSO_4*5H_2O$) was dissolved in 600 mls. of dionized $H_2O$;

170 g of potassium sodium tartrate was added while stirring;

50 g of sodium carbonate was added to the above solution while stirring;

50 g of sodium hydroxide pellets were dissolved in 100 mls. of water and this solution was then slowly added to the stirred copper solution;

Deionized water was then added to bring the total volume of solution to 810 mls; and Immediately before plating, 191 mls. of 37% formaldehyde was added to the solution.

The solution was at room temperature and the pH was measured to be 12.2. Immediately after placing the fiber and frame into solution, evidence of gas evolution was seen. Bubbling continued during the entire reaction time which was 33 min. This time period was indicated to be long enough to produce a copper coating of 1 micron in thickness. A color change in the solution was apparent after approximately 15 min. The solution changed from a clear blue to a cloudy, dark blue green. At the end of the reaction time, the fiber was rinsed and dried in a vacuum oven at 120° C. for 15 min. at a vacuum of 25 ml of Hg. The fibers were inspected visually and then a section was provided for SEM analysis. Three one and one-half inch sections were cut from the tow of fibers for consolidation into a composite.

Figure 11:
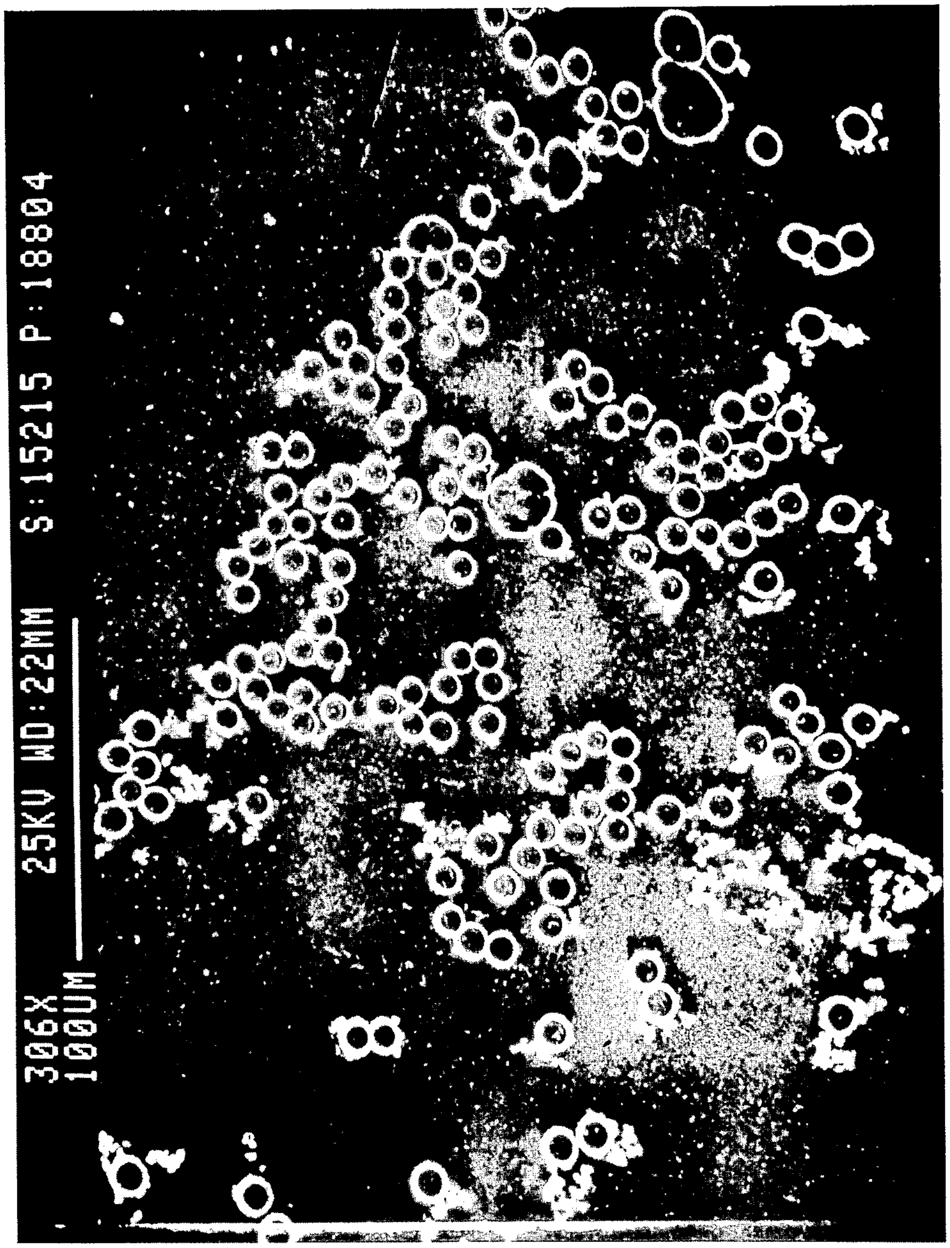
FIG. 11 is a cross-sectional view of copper coated fibers of Sakovich, et al.

The visual inspection of the fibers showed an excess of copper agglomerated on the tow. The color of the metallic plating was dark reddish brown. The inside of the tow was not easy to see since the outside of the bundle was covered in a dark powdery copper. On examining a polished cross section of the tow by scanning electron microscopy, the following was observed: the coating thickness was relatively uniform around the fiber circumference, however, the thickness varied from fiber to fiber. A typical view is shown in FIG. 11. The minimum thickness seen was 0.32 microns, and the maximum was 1.54 microns. The average thickness was 0.98 microns with a standard deviation of 0.43 microns. Only 43% of the fibers were individualized. The agglomeration was characterized as in Example 3A; the results are given below:

| Number of fibers in each agglomerate | 1 | 2 | 3 | 4 | 5 | 6 | greater than 6 |
|---|---|---|---|---|---|---|---|
| Percent of fibers | 43 | 16 | 13 | 7 | 4 | 4 | 12 |

COMPARATIVE EXAMPLE 5A

USSR Pat. No. 489,585, by Kuz'min teaches that to improve the physical and mechanical properties of a copper-graphite composite, the copper coating of the fibers is initially carried out by chemical precipitation and then by an electrolytic one, while the hot pressing is performed at a temperature of 920°–980° C. under a pressure of 35–250 kg/cm$^2$ In a paper published by the same experimenter, it is written that all elementary fibers are covered with a uniform layer of metal in the process of chemical precipitation. Although the experiment is not fully described in either the patent or the paper, it is possible to piece together a procedure between the two articles. The experiment in the literature was carried out on a carbon fiber produced in the form of a twisted tow, of 7,200 elementary fibers with a bean-shaped cross-section, with a diameter of 5.9 microns.

Fibers were oxidized by holding them in 65% nitric acid for 5 min. The following step was to activate the surface using an acidified palladous chloride bath. The patent specifies a pH of 3–4 but no concentrations were given. Treatment in stannous chloride solution was then carried out for ten minutes. No specific concentration or pH was given. Careful washing of the fiber with running water between treatments was recommended. The electroless copper plating solution, which is described in both the paper and the patent, is an alkaline solution containing copper sulfate, formaldehyde solution, sodium hydroxide, potassium-sodium tartrate, and sodium diethyldithiocarbonate. Two commercial sources did not carry any chemical named sodium diethyldithiocarbonate, but sodium diethyldithiocarbamate is listed and is known to be used as a chelating agent. Thus the use of carbonate was taken to be a typographical error. Neither the patent nor the journal article give concentrations for the components of the plating bath. However, comparison to the text by Lowenheim, abovementioned, does suggest a possible bath make-up. The coating thickness is given as between 0.1 to 0.4 microns for a residence time between 3 to 6 minutes. The electrolytic deposition of copper onto the graphite fibers is more fully described. The solution to be used is made from combining 260 g/L copper sulfate pentahydrate and 60 ml/L sulfuric acid and plating at a current density of 2–5 A/100 $cm^2$ and a pH of 1–2 in four hours. They report that consolidation into a composite is performed in a vacuum for 30 minutes at a temperature of 940° C. under pressure of 50 kg/$cm^2$. This method should produce a composite with a 5% weight fraction of fibers. The paper explains that in some of the composites scanning microscopy showed some defects in the composite, including "clusters of fibers, pores in the matrix".

Four 1-liter graduated cylinders were filled with the recommended solutions. A frame, made from a glass rod bent into a rectangular shape, was used to hold the fiber. The fiber used was a 40 in. long segment of 12,000 filament IM-6 graphite fiber (Hercules, 7 micron fiber), which was attached to the frame and ten twists were introduced into the fiber, then the second end was taped to the top of the frame. The fiber and frame were submersed into 65% nitric acid for 5 minutes then thoroughly rinsed with deionized water. The fiber was then held in a commercially available palladous chloride solution (Shipley Catalyst 9F) for 5 min. and carefully rinsed with deionized water. The fiber and frame was then treated in a stannous chloride bath (Shipley Accelerator 19) for ten minutes. Following the stannous chloride bath the fiber was thoroughly rinsed. A solution for the electroless deposition of copper was made by the following method:

13 g of copper pentahydrate ($CuSO_4.5H_2O$) were dissolved in 800 ml of deionized water;

66 g of potassium sodium tartrate was added to this solution while stirring;

0.018 g of sodium diethylydithiocarbamate was added to the above solution while stirring;

19.3 g of sodium hydroxide was dissolved in 100 mls of deionized water and this solution was slowly added to the stirred copper solution;

Deionized water was added to this solution to bring the volume to 960 ml total volume; and Immediately before plating, 38 mls of 37% formaldehyde was added to the solution.

Figure 8:
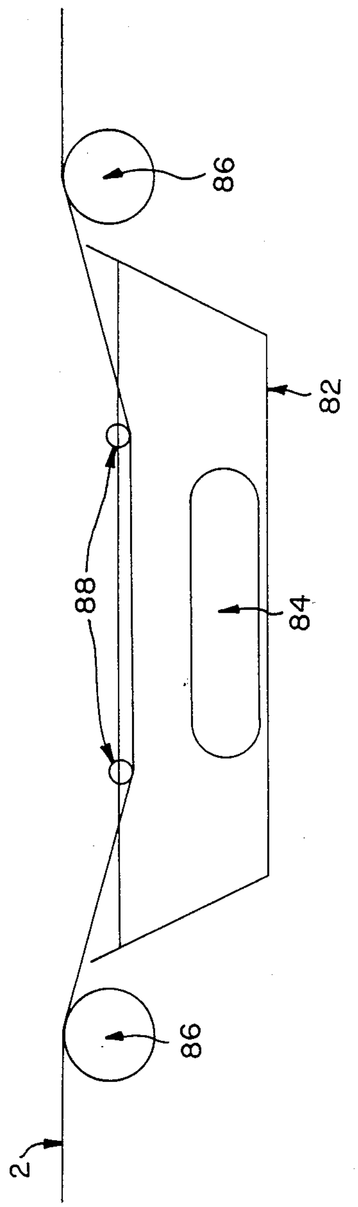
FIG. 8 is a cross-sectional view of an electroplating tank commonly used in the art.
Figure 12:
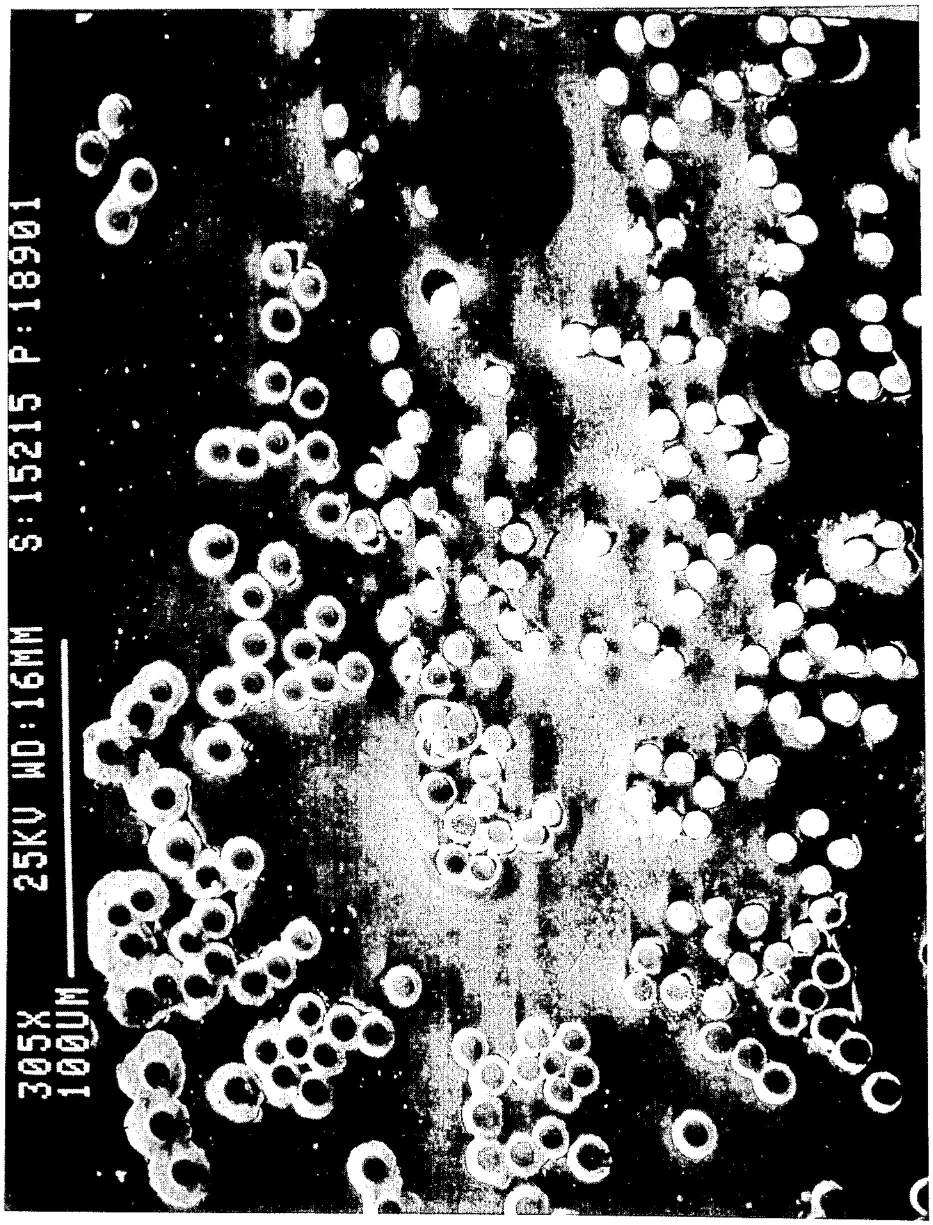
FIG. 12 is a cross-sectional view of copper coated fibers of Kuz'min, USSR Pat. No. 489,585 in a resin matrix, cut perpendicular to the fibers.

The solution was at room temperature for the treatment of the fibers. The fiber and frame was immersed in the plating solution for a total of five minutes. The fiber surface showed evidence of gas evolution upon immersion in the solution. At the end of the electroless plating period the fiber was washed carefully. An electroplating solution was prepared by dissolving 1040 g of $CuSO_4.5H_2O$ in 3.5 liters of deionized water while stirring. The solution was heated slightly in order to dissolve all the copper sulfate into this volume of water. The solution was then allowed to cool to room temperature. After cooling, 240 ml of sulfuric acid was carefully added to this solution. Deionized water was then added to bring the total volume of solution to 4 liters. Electroplating was performed in a tank 82 (FIG. 8) which contained an OFHC grade copper bar stock anode 84. The cathodes were two sections of copper tubing which were both supplied with current. Each end of the fiber 2 was wrapped around a cathode roller 86. A section of fiber approximately 125 cm in length was held below the surface of the solution by two bent glass rods 88. The power supply was turned on and current controlled. The current was slowly increased to 5 Amps. The cathodes 86 and the section of fiber between the cathode 86 and solution surface was kept cool by spraying this section with water from a plastic rinse bottle. After approximately 20 min. the fiber began to spark near the intersection of the fiber and the solution interface. At this point the experiment was discontinued. The coated fiber 30 was removed from the bath, rinsed and then dried in a vacuum drying oven for 15 min. at a vacuum of 25 mm of Hg. A small section of fiber was cut out of the coated tow and provided for scanning electron microscopy. Visual inspection of the tow showed some areas of incomplete coverage. The fibers did not spread easily, suggesting that neighboring fibers were plated together. Three small sections of fiber were removed and used to prepare a composite sample. Visual inspection had further shown that coverage of the fiber was incomplete. This was documented by the SEM analysis. Cross sections of the coated fiber tows 30 showed relatively good evenness of coating thickness around the circumference of the fibers, but very large variations from fiber to fiber in the tow 30. Many of the fibers in the center of the tow 30 were uncoated and near the surface of the tow 30 coatings as thick as 20 microns were found. A typical view is shown in FIG. 12. Agglomeration was severe, only 7% of the fiber was individualized. Agglomeration was as follows:

| Number of fibers in each agglomerate | 1 | 2 | 3 | 4 | 5 | 6 | greater than 6 |
|---|---|---|---|---|---|---|---|
| Percent of fibers | 7 | 5 | 4 | 4 | 4 | 3 | 34 |

In addition, 36% of the fibers were uncoated.

COMPARATIVE EXAMPLE 6A

Japanese Pat. No. 70-17095 (1985) by Yashioka et al., teaches that electroplating graphite fibers in copper electroplating baths without a brightener creates a non-bright coating with poor slidability during knitting into a cloth due to the roughness of the coating. The patent states that its objective is to produce copper coated carbon fibers with an improved discoloration resistance and slidability. A number of copper electroplating baths are discussed and the availability of suitable brighteners is assured. For example, UBAC-1 (trade name OMI Corp.) is used for a copper sulfate bath, and copper ryumu (trade name MKT Co.) is used for a cyanide bath. In Actual Example 1: a bundle of carbon fibers consisting of 3,000 single fibers having an average diameter of about 7 (microns) was pretreated by calcining at ca. 500° C. and plated in a copper sulfate plating bath containing a brightener (composition: copper sulfate 100 g/l, sulfuric acid 100 g/l, brightener UBAC-1 10 ml/l,Cl- 10 ppm) at an average current density of 6 A/dm 2, yielding a ca 2-(micron) thick bright copper-plated layer. This was compared to a sample which did not contain a brightener as to the brightness and slidability.

For comparison purposes, a section of 12K IM-6 graphite fiber 1.5 meters in length was pulled into a tube furnace which had been heated to 500° C. The fiber was treated in air at this temperature for 5 minutes. The center of the length of this tow, approximately 30 in., was marked and used for the electrolytic plating according to the patent description. A total volume of 8 liters of solution was made in two 4-liter Erlenmeyer flasks. The procedure for preparing the solution was as follows:

Stir together:
3 liters of deionized water;
400 g. of $CuSO_4.5H_2O$;
400 ml. of sulfuric acid;
40 ml. of UBAC-1 brightener; and
0.33 ml. 35% HCl acid solution.

Figure 13:
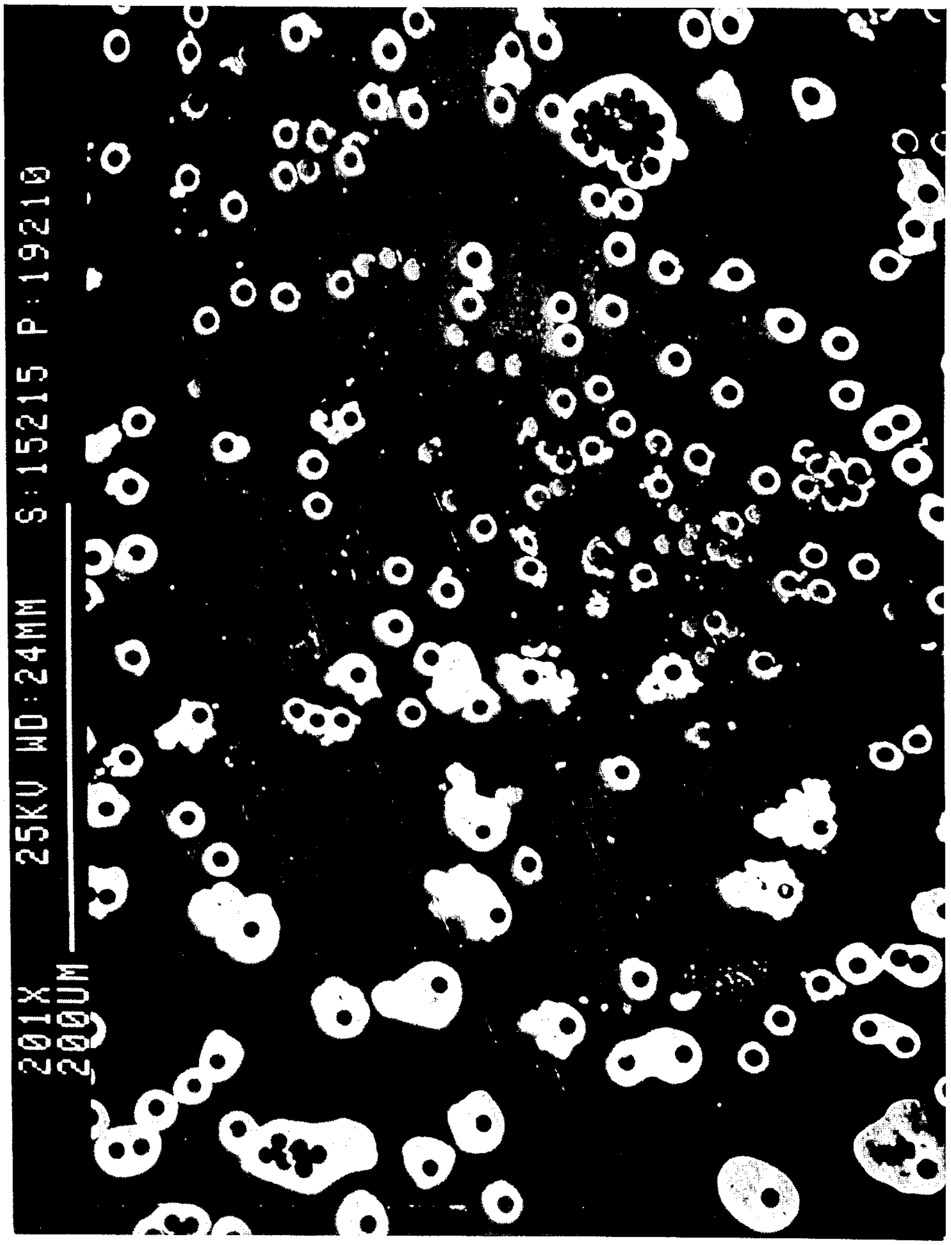
FIG. 13 is a cross-sectional view of copper coated fibers of Yashioka et al., Japanese Pat. No. 70-17095 in a resin matrix cut perpendicular to the fibers.

Electroplating was performed in a tank 82 (FIG. 8) which contained an OFHC grade copper bar stock anode 84. The cathodes 86 were two sections of copper tubing which were both supplied with current. Each end of the fiber 2 was wrapped around a cathode roller 86. A section of fiber 2 approximately 20 inches in length was held below the surface of the solution by two bent glass rods 88. The power supply was turned on and current controlled. The current was slowly increased to 5 Amps. The cathodes 86 and the section of fiber 2 between the cathode 86 and solution surface was kept cool by spraying this section with water from a plastic rinse bottle. After approximately 20 minutes the fiber began to spark near the intersection of the fiber and the solution interface. At this point the experiment was discontinued. The fiber was removed from the bath, rinsed and then dried in a vacuum drying oven for 15 minutes at a vacuum of 25 mm of Hg. A small section of fiber was cut out of the tow and submitted for evaluation by scanning electron microscopy. Visual inspection of the tow showed some areas of incomplete coverage. The quality was not suitable for hot-pressing. A typical view is shown in FIG. 13. The fibers did not spread apart easily, suggesting some evidence of plating together of neighboring fibers.

SEM analysis of cross sections of the two tows showed the following:

Sample A

Evenness around circumference: Extremely poor, e.g., 14.7 to 3.5 micron thickness on a single fiber.

| Evenness from fiber to fiber: | | | | | | | |
|---|---|---|---|---|---|---|---|
| Minimum thickness: | 0 microns (uncoated) | | | | | | |
| Maximum thickness: | 38 microns | | | | | | |
| Agglomeration: | | | | | | | |
| Number of fibers in each agglomerate | 1 | 2 | 3 | 4 | 5 | 6 | greater than 6 |

-continued

| | | | | | | | |
|---|---|---|---|---|---|---|---|
| Percent of fibers | 51 | 10 | 6 | 3 | 1 | 2 | 12 |

In addition, 15% of the fibers were either not coated or only partially coated.

COMPARATIVE EXAMPLES 7A–9A

Figure 9:
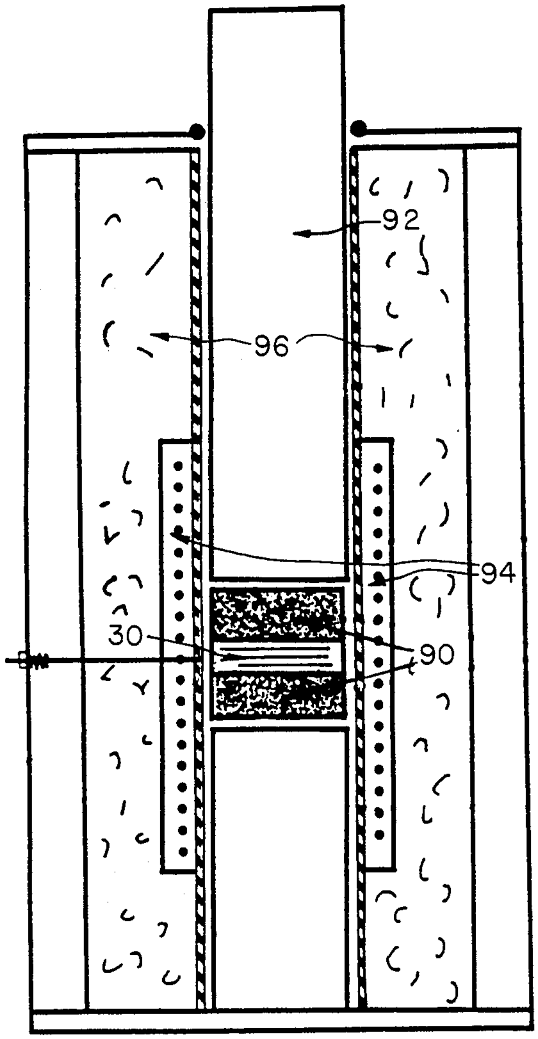
FIG. 9 is a schematic view of a hot press apparatus suitable for use in the present invention.
Figure 14:
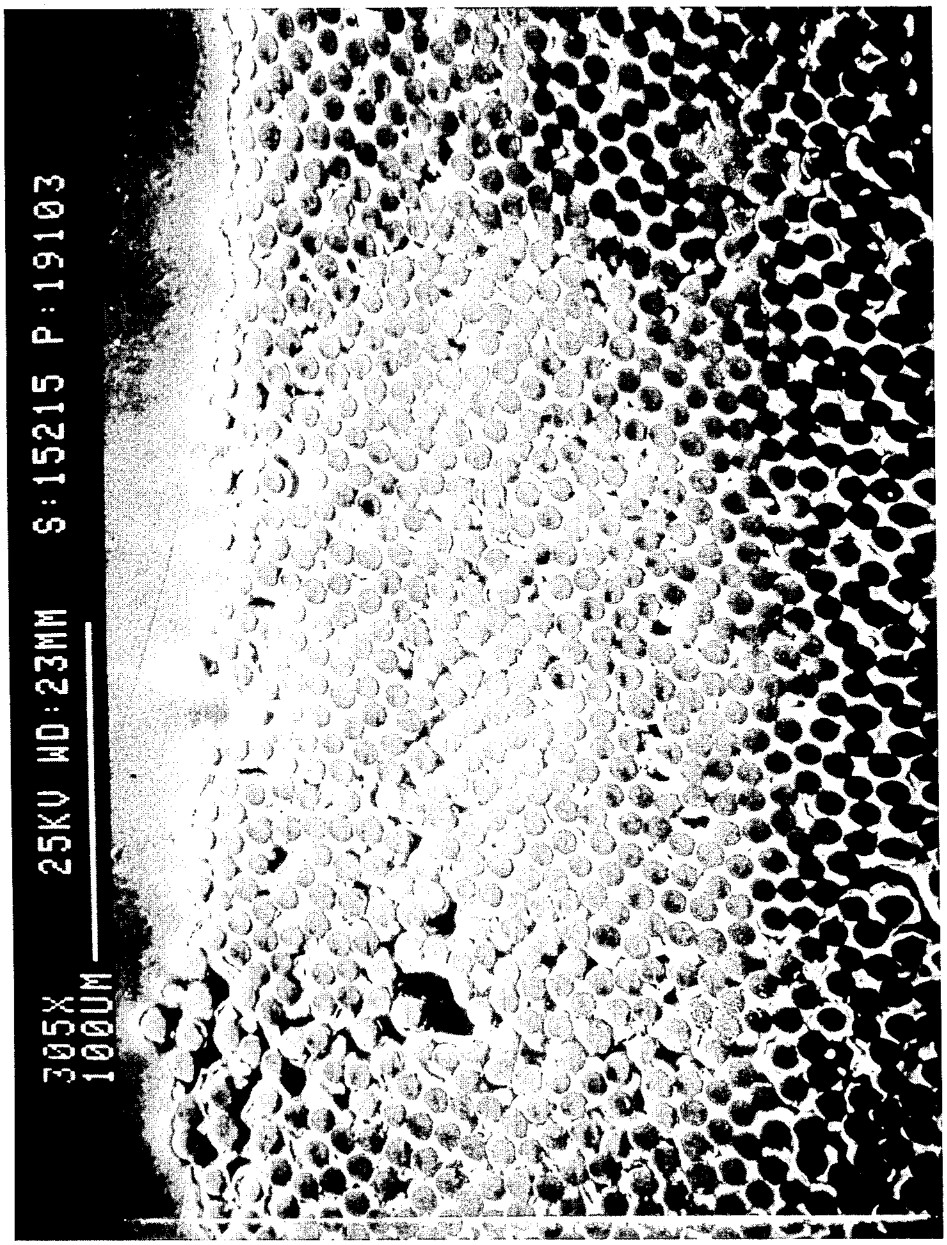
FIG. 14 is a cross-sectional view of consolidated copper coated fibers of Schmitt, German Pat. No. 2,658,234 cut perpendicular to the fiber length.
Figure 15:
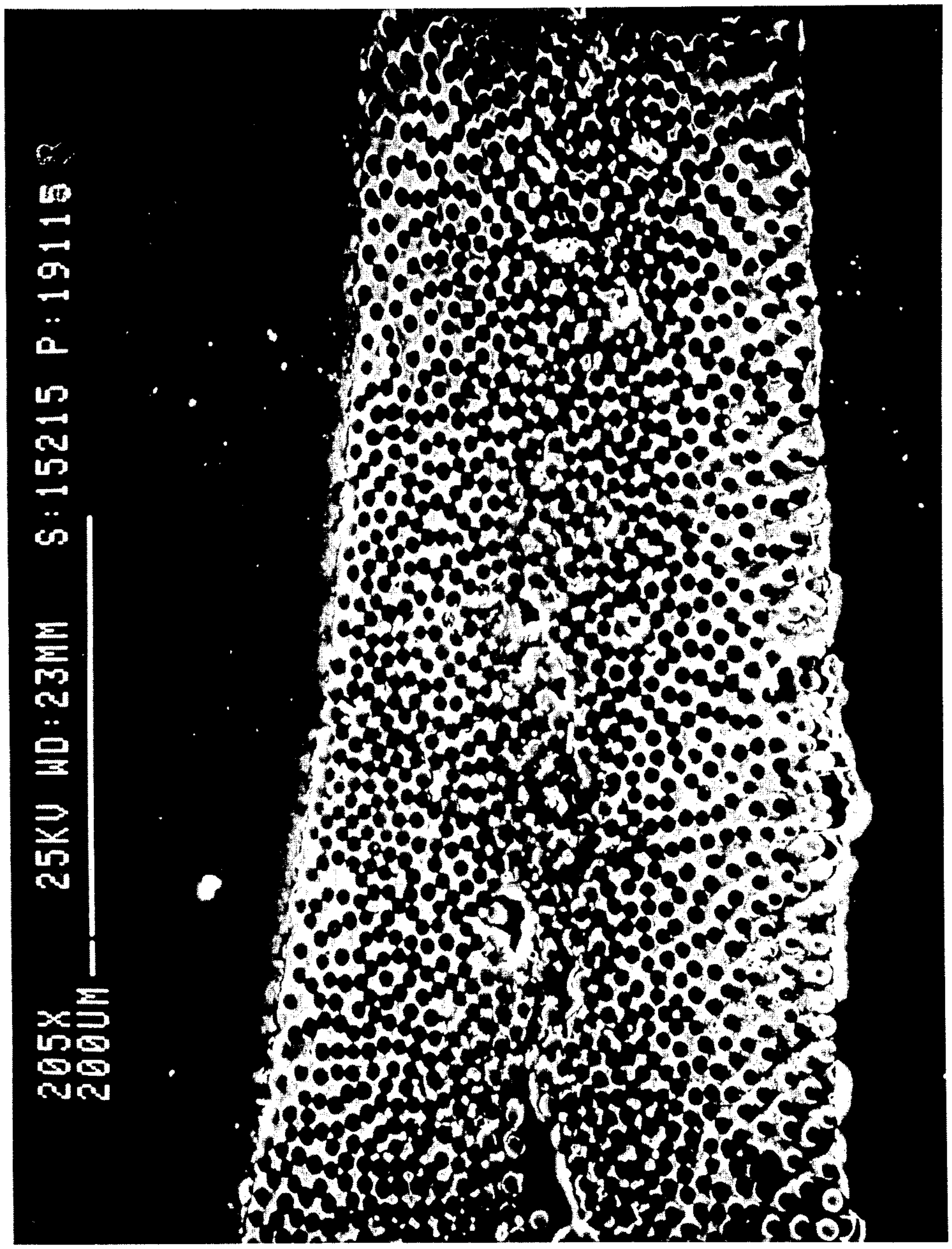
FIG. 15 is a cross-sectional view of consolidated copper coated fibers of Sakovich et al. cut perpendicular to the fiber length.
Figure 16:
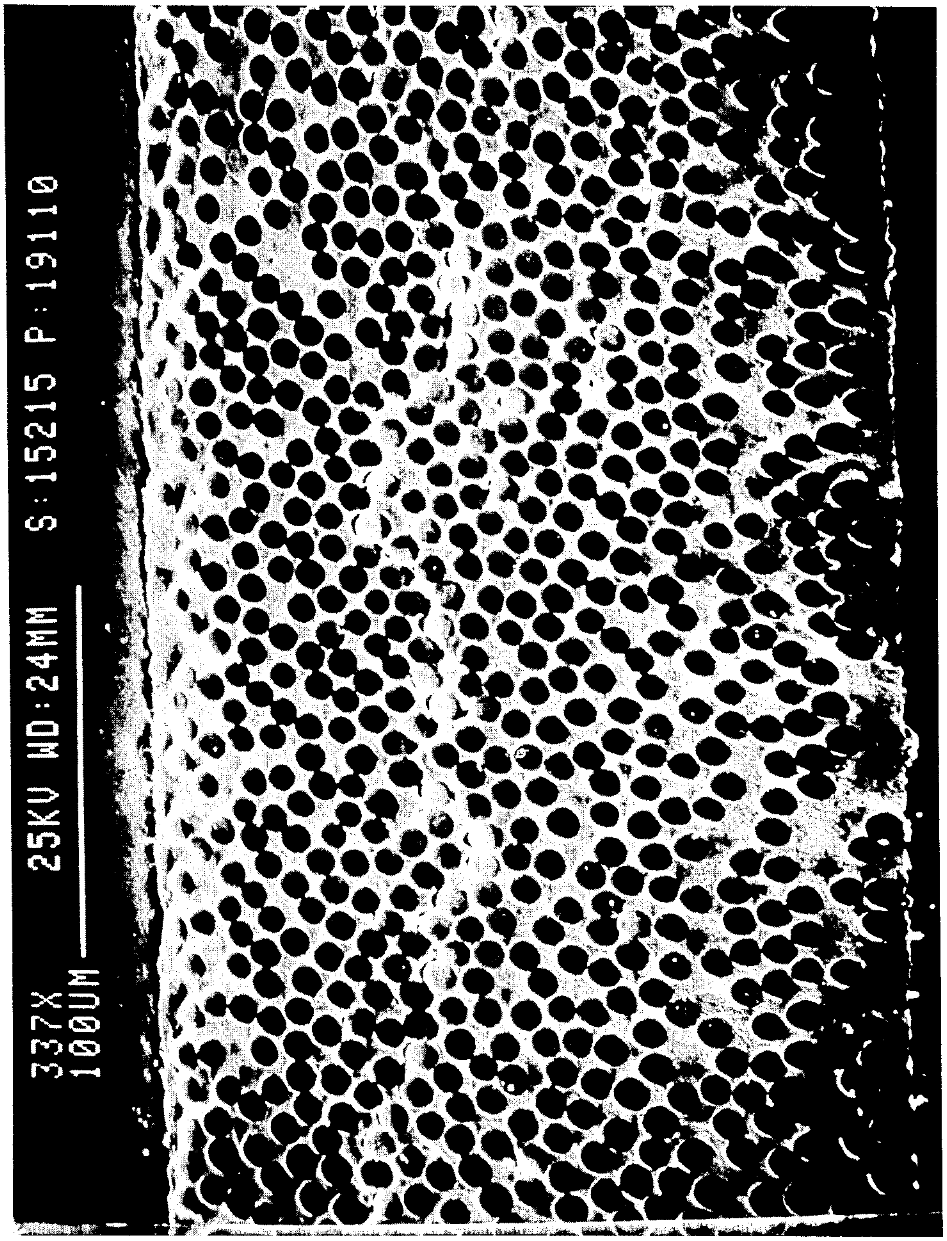
FIG. 16 is a cross-sectional view of consolidated copper coated fibers of Kuz'min, USSR Pat. No. 439,585, cut perpendicular to the fiber length.

Using fiber prepared in Comparative Examples 3A–5A composites were formed according to the hot pressing techniques described in the literature of 1975. Processing was performed by laying the section of fibers together between two pieces of flexible graphite sheets (POCO Graphite, Decature, Tex.) and then consolidating at 920° C. for 30 minutes at a pressure between 600 and 750 psi under an atmosphere of 3% hydrogen, 97% nitrogen. The heat up time for the hot press (FIG. 9) was one hour and 35 minutes. The hot press shown in FIG. 9 comprised a graphite die 90 above and below the coated fibers 30 pressed by a hydrolic ram 92. Adjacent to the fibers 30 and die 90 was the heating element 94 surrounded by insulation 96 in the press. Once the furnace was cooled to 250° C. the samples were removed. They were then potted in epoxy for metallographic sectioning and polishing for microscopic analysis. Each of the composites had voids, delaminations, matrix rich regions and, in the case of the fiber of Example 5A, large unconsolidated sections due to the uncoated fiber in the coated tow 30. Photomicrographs of the composites of comparative Examples 7A–9A appear herein as FIGS. 14–16, respectively.

The foregoing comparative data demonstrate that relatively thick, uniform and firmly adherent layers of copper are not deposited on carbon cores if the teachings of the prior art are followed, in spite of allegations to the contrary. Moreover, the results demonstrate that uniform, substantially void free composites are not obtained by hot pressing fibers prepared according to the prior art.

The above-mentioned patents, publications, patent applications, technical information sheets and test methods are incorporated herein by reference.

Many variations of the present invention will suggest themselves to those skilled in this art in light of the above, detailed description. For example, instead of carbon fibers, aumina fibers can be used. All such obvious variations are within the full intended scope of the invention defined by the appended claims.

I claim:

1. An injection molding compound comprising elongated granules, each of said granules containing a bundle of elongated composite fibers which have a fiber core and at at least one relatively thick, uniform and firmly adherent, electrically conductive layer comprising copper on said core, said fibers extending generally parallel to each other longitudinally of the granule and substantially uniformly dispersed throughout said granule in a thermally stable, film forming non-crosslinkable thermoplastic adhesive which substantially disperses on contact with hot molten plastic, said fibers being present in an amount from 67.5–97.5% by volume and said adhesive being present in an amount of from 2.5–32.5% by volume.

2. An injection molding compound as defined in claim 1 wherein the thickness of said metal layer or layers ranges from about 0.6 to about 3.0 microns.

3. An injection molding compound as defined in claim 2 wherein said thickness is at least about 0.8 microns.

4. An injection molding compound as defined in claim 3 wherein said thickness is at least about 1.2 microns.

5. An injection molding compound as defined in claim 1 wherein standard deviation of the coating thickness is less than 30% of the average coating thickness, both around the circumference of each fiber and from fiber to fiber.

6. An injection molding compound as defined in claim 1 wherein the majority of the fibers are individualized and non-aggregated.

7. An injection molding compound as defined in claim 6 wherein more than about 70% of the fibers are individualized and non-aggregated.

8. An injection molding compound as defined in claim 7 wherein more than about 80% of the fibers are individualized and non-aggregated.

9. An injection molding compound as defined in claim 1 wherein said core comprises carbon, graphite, a polymer, glass, a ceramic, or a combination of any of the foregoing.

10. An injection molding compound as defined in claim 1 wherein said core comprises carbon.

11. An injection molding compound as defined in claim 1 wherein said adhesive comprises:

(a) a poly($C_2$–$C_6$ alkyl oxazoline) in combination with (b) a poly(vinylpyrrolidone), said adhesive substantially surrounding each said filament.

12. An injection molding compound as defined in claim 11 wherein component (b) comprises from about 7.5 to about 75 percent by weight of component (a) and component (b) combined.

13. An injection molding compound as defined in claim 1 wherein said granules are from about one-forty eighth to about three-sixteenths inches in diameter.

14. An injection molding compound as defined in claim 13 wherein said granules are from about one-thirty second to about one-eighth inches in diameter.

15. An injection molding compound as defined in claim 1 wherein said fibers are present in an amount of from 85 to 95% by volume and said adhesive is present in an amount of from 5–15% by volume.

16. An injection molding compound as defined in claim 2 wherein thermoplastic adhesive comprises poly(ethyl oxazoline).

17. An injection molding compound as defined in claim 16 wherein poly(ethyl oxazoline) has a molecular weight in the range from about 50,000 to about 500,000.

18. An injection molding compound as defined in claim 2 wherein the thermoplastic adhesive comprises poly(ethyl oxazoline) and poly(vinylpyrrolidone).

19. An injection molding compound as defined in claim 18 wherein the poly(vinylpyrrolidone) has a molecular weight in the rage of from about 10,000 to about 220,000.

20. An injection molding composition comprising:

(i) thermoplastic resin molding granules; and (ii) elongated granules as defined in claim 1, the amount of component (ii) in said composition being sufficient to provide 1–60% by weight of said fibers per 100% by weight of (i) plus (ii).

* * * * *